(12) United States Patent
Steffes

(10) Patent No.: US 11,383,645 B2
(45) Date of Patent: Jul. 12, 2022

(54) EXTERIOR REARVIEW MIRROR WITH POWER EXTENDING MECHANISM

(71) Applicant: Magna Mirrors of America, Inc., Holland, MI (US)

(72) Inventor: Matthew V. Steffes, Hopkins, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 148 days.

(21) Appl. No.: 15/929,612

(22) Filed: May 13, 2020

(65) Prior Publication Data

US 2020/0361381 A1 Nov. 19, 2020

Related U.S. Application Data

(60) Provisional application No. 62/926,584, filed on Oct. 28, 2019, provisional application No. 62/846,849, filed on May 13, 2019.

(51) Int. Cl.
*B60R 1/07* (2006.01)

(52) U.S. Cl.
CPC ..................... *B60R 1/07* (2013.01)

(58) Field of Classification Search
CPC ........ B60R 1/0605; B60R 1/07; B60R 1/072; B60R 1/074; B60R 1/078
USPC .................................................. 359/841, 877
See application file for complete search history.

(56) References Cited

U.S. PATENT DOCUMENTS

| | | | |
|---|---|---|---|
| 4,558,930 A * | 12/1985 | Deedreek | G02B 7/1827 248/480 |
| 4,915,493 A | 4/1990 | Fisher et al. | |
| 4,936,670 A * | 6/1990 | Yoo | G02B 7/1827 359/841 |
| 5,033,835 A | 7/1991 | Platzer, Jr. | |
| 5,050,977 A | 9/1991 | Platzer, Jr. | |
| 5,066,112 A | 11/1991 | Lynam et al. | |
| 5,073,012 A | 12/1991 | Lynam | |
| 5,080,492 A | 1/1992 | Platzer, Jr. | |
| 5,331,471 A | 7/1994 | Gilbert | |
| 5,371,659 A | 12/1994 | Pastrick et al. | |
| 5,483,385 A | 1/1996 | Boddy | |
| 5,497,305 A | 3/1996 | Pastrick et al. | |
| 5,497,306 A | 3/1996 | Pastrick | |

(Continued)

FOREIGN PATENT DOCUMENTS

DE 19538771 A1 4/1997

*Primary Examiner* — Ricky D Shafer
(74) *Attorney, Agent, or Firm* — Honigman LLP

(57) ABSTRACT

A vehicular exterior rearview mirror assembly includes a mirror head having a mirror casing and a mirror reflective element, a support structure configured for attachment at a side of a vehicle, with the mirror head adjustably mounted at the support structure. The support structure extends laterally from the side of the vehicle. An adjustment mechanism is disposed at the end of the support structure. The adjustment mechanism is movably received at the mirror head and includes a rotatably driven gear that engages a toothed track of a mirror head bracket. Rotation of the gear causes translational movement of the mirror head bracket and the mirror head relative to the support structure to adjust the mirror head position relative to the support structure between a retracted position and an extended position.

18 Claims, 27 Drawing Sheets

Bracket telescopes along tubes.

(56) References Cited

U.S. PATENT DOCUMENTS

| | | | |
|---|---|---|---|
| 5,572,376 A * | 11/1996 | Pace | B60R 1/078 359/862 |
| 5,669,699 A | 9/1997 | Pastrick et al. | |
| 5,669,705 A | 9/1997 | Pastrick et al. | |
| 5,774,283 A | 6/1998 | Nagel et al. | |
| 5,823,654 A | 10/1998 | Pastrick et al. | |
| 5,863,116 A | 1/1999 | Pastrick et al. | |
| 5,879,074 A | 3/1999 | Pastrick | |
| 5,886,838 A * | 3/1999 | Kuramoto | B60R 1/07 359/841 |
| 6,050,537 A | 4/2000 | Fimeri | |
| 6,074,077 A | 6/2000 | Pastrick et al. | |
| 6,086,229 A | 7/2000 | Pastrick | |
| 6,094,027 A | 7/2000 | Willmore et al. | |
| 6,099,153 A | 8/2000 | Zimmermann et al. | |
| 6,099,155 A | 8/2000 | Pastrick et al. | |
| 6,116,743 A | 9/2000 | Hoek | |
| 6,139,159 A | 10/2000 | Whitehead | |
| 6,139,171 A | 10/2000 | Waldmann | |
| 6,176,602 B1 | 1/2001 | Pastrick et al. | |
| 6,213,609 B1 | 4/2001 | Foote et al. | |
| 6,227,675 B1 | 5/2001 | Mertens et al. | |
| 6,239,928 B1 | 5/2001 | Whitehead et al. | |
| 6,250,783 B1 | 6/2001 | Stidham et al. | |
| 6,254,242 B1 | 7/2001 | Henion et al. | |
| 6,276,808 B1 | 8/2001 | Foote et al. | |
| 6,280,068 B1 | 8/2001 | Mertens et al. | |
| 6,280,069 B1 | 8/2001 | Pastrick et al. | |
| 6,296,379 B1 | 10/2001 | Pastrick | |
| 6,299,333 B1 | 10/2001 | Pastrick et al. | |
| 6,315,419 B1 | 11/2001 | Platzer, Jr. | |
| 6,325,518 B1 | 12/2001 | Whitehead et al. | |
| 6,394,616 B1 | 5/2002 | Foote et al. | |
| 6,416,192 B2 | 7/2002 | Home et al. | |
| 6,416,208 B2 | 7/2002 | Pastrick et al. | |
| 6,439,730 B1 * | 8/2002 | Foote | B60R 1/0617 359/871 |
| 6,467,920 B2 | 10/2002 | Schnell et al. | |
| 6,474,822 B2 | 11/2002 | Swindon et al. | |
| 6,474,853 B2 | 11/2002 | Pastrick et al. | |
| 6,494,602 B2 | 12/2002 | Pastrick et al. | |
| 6,497,491 B2 | 12/2002 | Boddy et al. | |
| 6,517,227 B2 | 2/2003 | Stidham et al. | |
| 6,522,451 B1 | 2/2003 | Lynam | |
| 6,572,250 B1 | 6/2003 | Assinder et al. | |
| 6,685,348 B2 | 2/2004 | Pastrick et al. | |
| 6,695,465 B2 | 2/2004 | Apfelbeck | |
| 6,709,136 B2 | 3/2004 | Pastrick et al. | |
| 6,717,712 B2 | 4/2004 | Lynam et al. | |
| 6,755,543 B1 | 6/2004 | Foote et al. | |
| 6,799,856 B2 | 10/2004 | Foote et al. | |
| 6,832,848 B2 | 12/2004 | Pastrick | |
| 6,877,868 B2 | 4/2005 | Olijnyk et al. | |
| 6,896,380 B2 * | 5/2005 | McPherson | B60R 1/078 248/226.11 |
| 6,896,385 B2 | 5/2005 | Foote | |
| 6,902,306 B2 | 6/2005 | Pastrick et al. | |
| 6,905,235 B2 | 6/2005 | Stidham et al. | |
| 7,008,089 B1 | 3/2006 | McCloy et al. | |
| 7,097,312 B2 | 8/2006 | Platzer, Jr. | |
| RE39,328 E | 10/2006 | Fimeri | |
| 7,114,817 B2 * | 10/2006 | Evans | B60R 1/078 359/841 |
| 7,126,456 B2 | 10/2006 | Boddy et al. | |
| 7,140,755 B2 | 11/2006 | Pastrick et al. | |
| 7,140,756 B2 | 11/2006 | McCloy et al. | |
| 7,168,830 B2 | 1/2007 | Pastrick et al. | |
| 7,195,381 B2 | 3/2007 | Lynam et al. | |
| 7,244,912 B1 | 7/2007 | Rawlings | |
| 7,255,451 B2 | 8/2007 | McCabe et al. | |
| 7,267,449 B1 | 9/2007 | Boddy et al. | |
| 7,270,429 B2 * | 9/2007 | Peterson | B60R 1/062 359/841 |
| 7,270,430 B2 | 9/2007 | Olijnyk et al. | |
| 7,303,297 B1 | 12/2007 | Foote et al. | |
| 7,325,953 B2 | 2/2008 | Pastrick | |
| 7,334,925 B2 | 2/2008 | Pastrick et al. | |
| 7,350,931 B1 * | 4/2008 | Peterson | B60R 1/06 359/841 |
| 7,377,675 B2 | 5/2008 | Pastrick et al. | |
| 7,393,111 B2 | 7/2008 | Fuchs et al. | |
| 7,441,911 B2 * | 10/2008 | Ruse | B60R 1/0605 248/478 |
| 7,540,619 B2 * | 6/2009 | Henion | B60R 1/002 359/876 |
| 7,547,127 B2 | 6/2009 | Pastrick | |
| 7,748,856 B2 | 7/2010 | Zhao | |
| 7,748,857 B2 | 7/2010 | Fimeri et al. | |
| 7,824,045 B2 | 11/2010 | Zhao | |
| 7,887,204 B2 | 2/2011 | Zhao | |
| 7,934,844 B1 | 5/2011 | Zhao | |
| 8,021,005 B2 | 9/2011 | Zhao | |
| 8,736,940 B2 | 5/2014 | Rawlings | |
| 8,917,437 B2 | 12/2014 | Baur et al. | |
| 9,796,334 B2 | 10/2017 | Peterson et al. | |
| 2015/0224930 A1 | 8/2015 | Foote et al. | |

\* cited by examiner

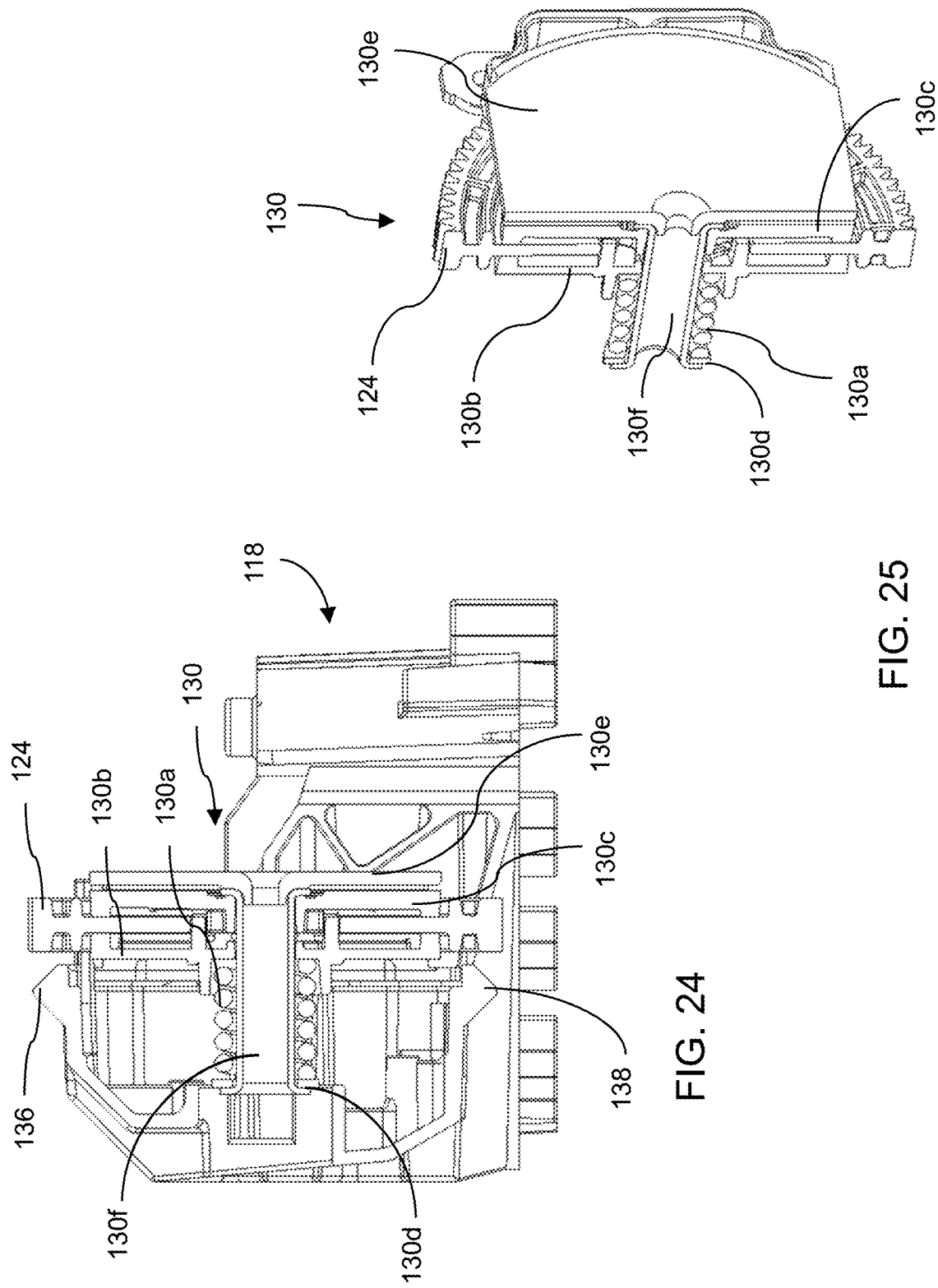

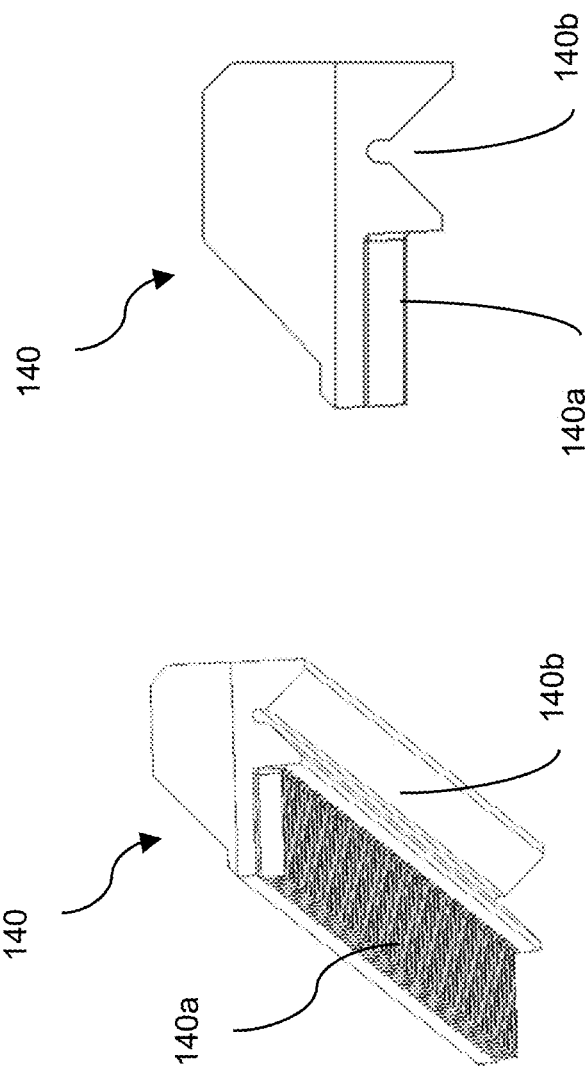

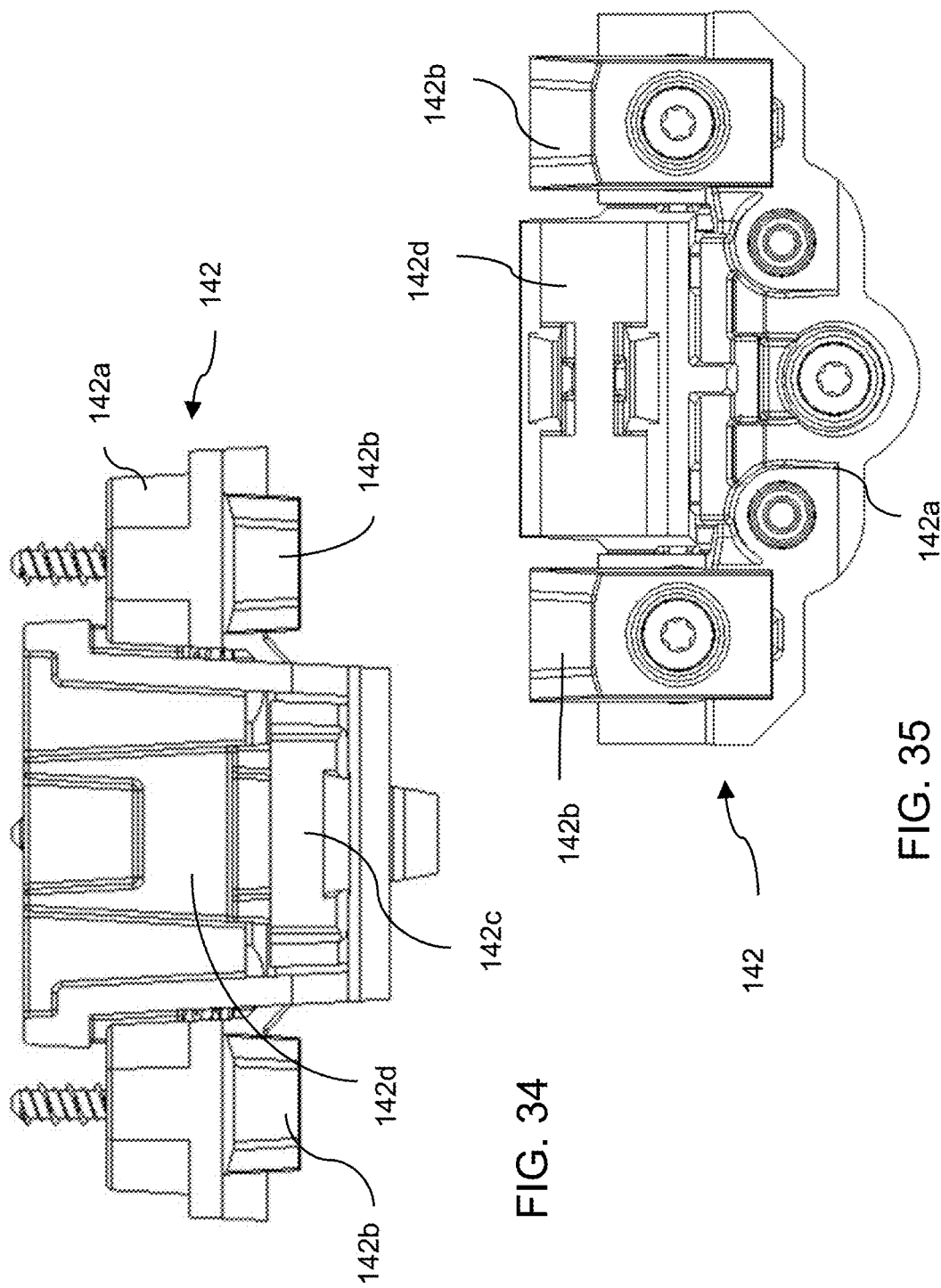

EXTERIOR REARVIEW MIRROR WITH POWER EXTENDING MECHANISM

CROSS REFERENCE TO RELATED APPLICATIONS

The present application claims the filing benefits of U.S. provisional application Ser. No. 62/926,584, filed Oct. 28, 2019, and U.S. provisional application Ser. No. 62/846,849, filed May 13, 2019, which are hereby incorporated herein by reference in their entireties.

FIELD OF THE INVENTION

The present invention relates generally to the field of exterior rearview mirror assemblies for vehicles and, more particularly, to extendable and retractable exterior rearview mirror assemblies for vehicles.

BACKGROUND OF THE INVENTION

It is known to provide an automotive exterior rearview mirror assembly that may be extended and retracted, such as for trailer towing applications, where the mirror assembly may be extended to provide enhanced rearward viewing to the driver of the trailer pulling vehicle. Examples of extendable and retractable mirror assemblies are described in U.S. Pat. Nos. 5,483,385; 6,116,743; 6,213,609; 6,239,928; 6,276,808; 6,325,518; 6,394,616 and/or 6,497,491, which are hereby incorporated herein by reference in their entireties.

SUMMARY OF THE INVENTION

The present invention provides an exterior rearview mirror assembly (configured for mounting at a side of an equipped vehicle) that includes an extending/retracting mechanism and actuator that is operable to move the mirror head between a retracted position and an extended position. The actuator comprises a motor that is disposed at a support structure configured for mounting the mirror head at the side of the vehicle. The actuator and motor and output gear are disposed at or integrated in an outboard end of the support structure or arm that extends from the side of the vehicle, while a mirror head bracket of the mirror head engages an output gear or drive gear of the actuator. The motor, when actuated, rotates the output gear, which is engaged with a toothed track of the mirror head bracket of the mirror head, to impart translational lateral movement of the mirror head relative to the support structure and relative to the side of the vehicle at which the mirror assembly is mounted.

These and other objects, advantages, purposes and features of the present invention will become apparent upon review of the following specification in conjunction with the drawings.

BRIEF DESCRIPTION OF THE DRAWINGS

FIG. 3 is another view of the exterior rearview mirror assembly of FIG. 1, shown in its extended state;

FIG. 24 is a sectional view of the support arm and actuator assembly;

FIG. 25 is a perspective and partial sectional view of the actuator;

FIG. 30 is a perspective view of the upper rail engaging portion of the mirror head bracket;

FIG. 31 is an end view of the upper rail engaging portion of the mirror head bracket;

FIG. 34 is a top view of the lower bracket; and

FIG. 35 is a side view of the lower bracket.

DESCRIPTION OF THE PREFERRED EMBODIMENTS

Figure 1:
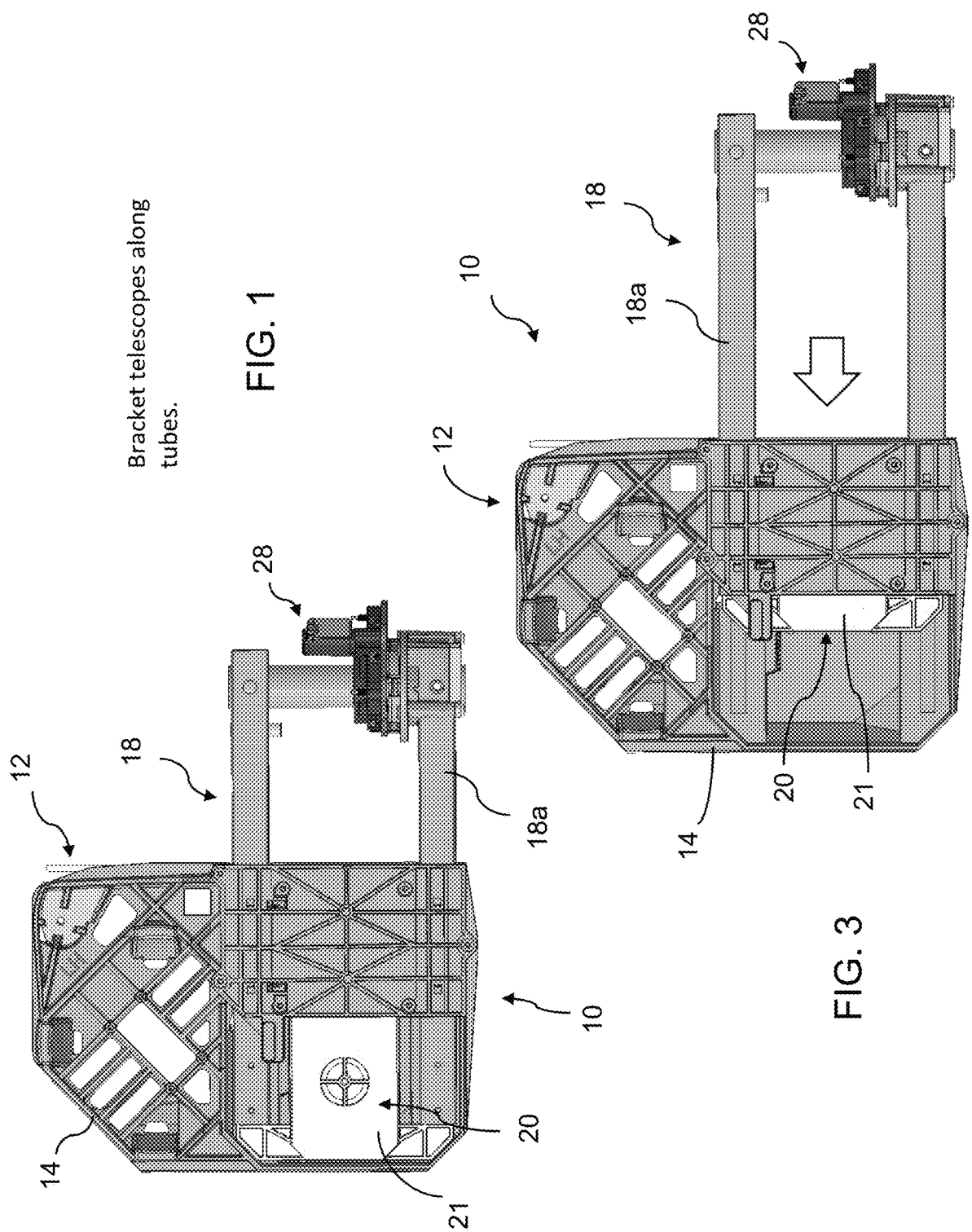
FIG. 1 is a view of an exterior rearview mirror assembly in accordance with the present invention, shown with portions removed and shown in its retracted state.
Figure 2:
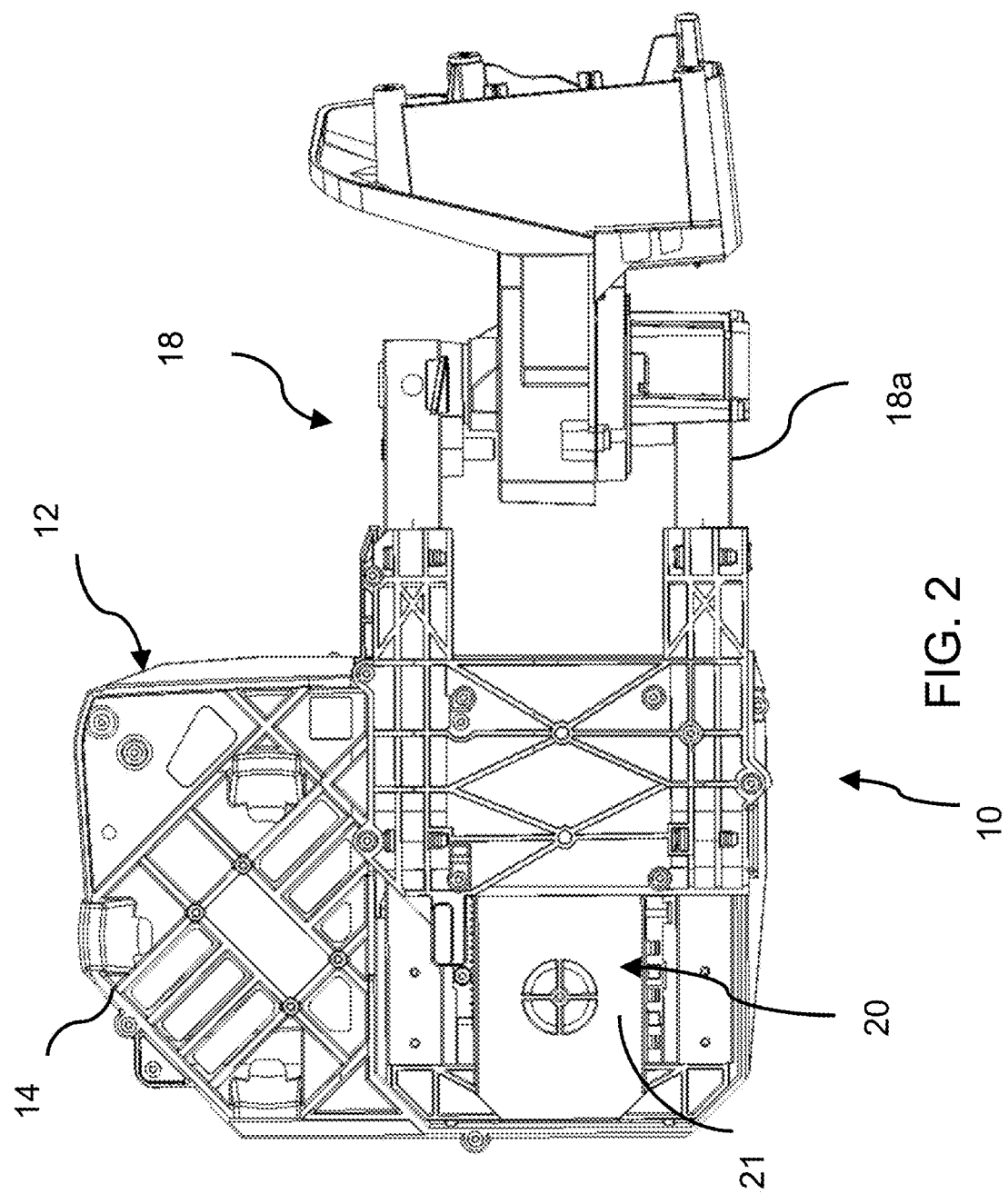
FIG. 2 is another view of the exterior rearview mirror assembly, similar to FIG. 1.
Figure 4:
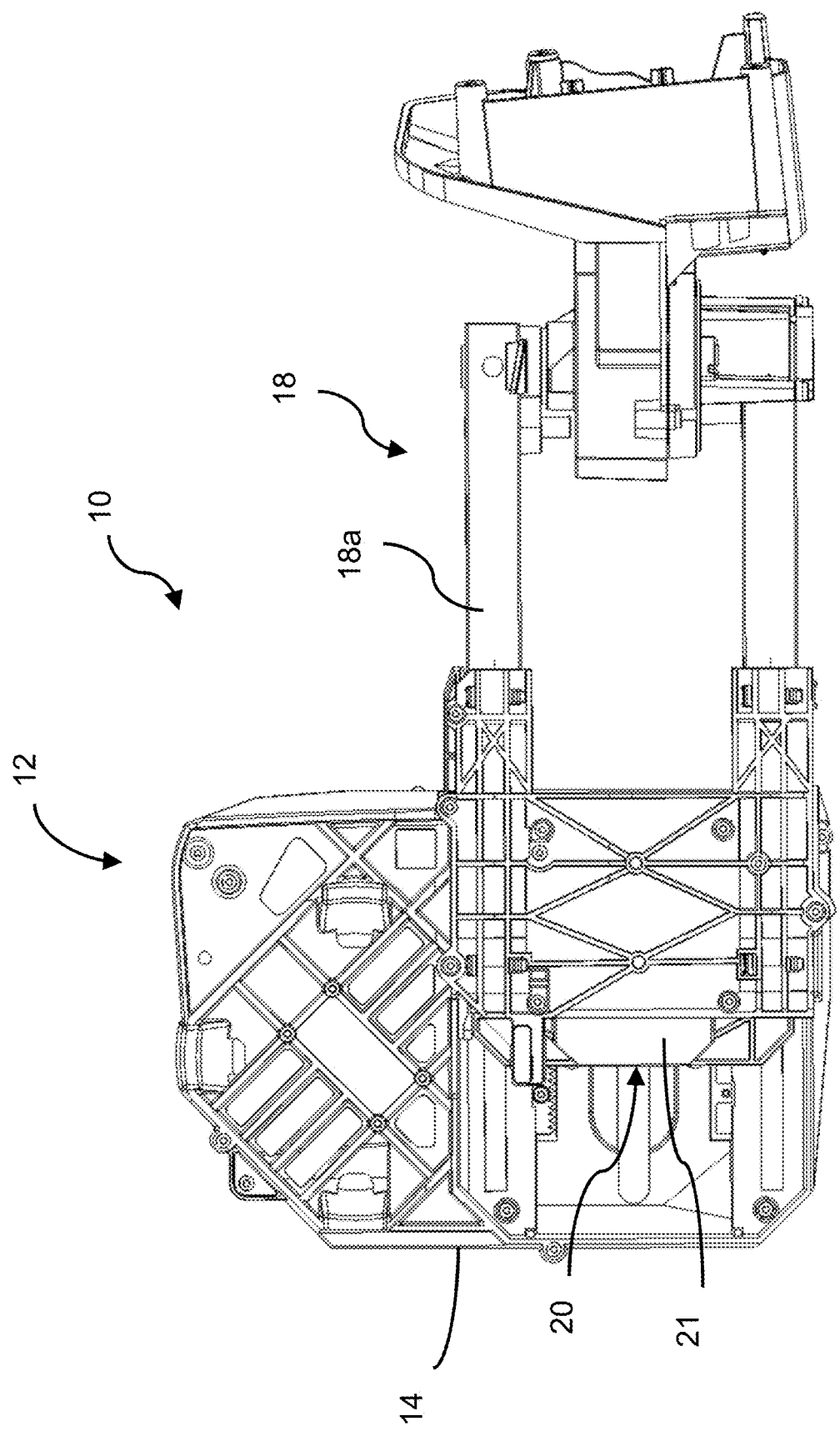
FIG. 4 is another view of the exterior rearview mirror assembly, similar to FIG. 3.
Figure 6:
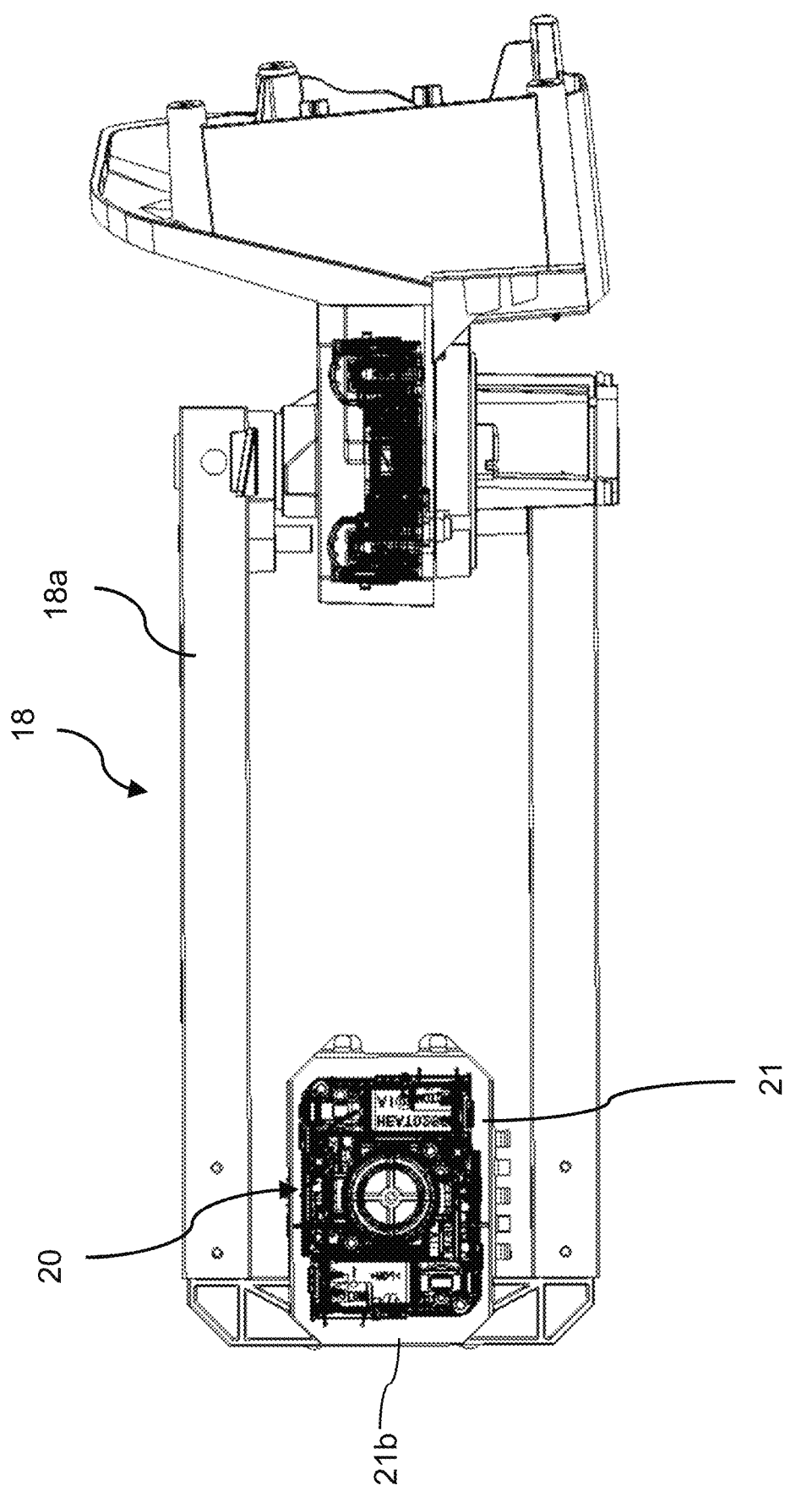
FIGS. 6 and 7 are views of the extending and retracting mechanism, with the mirror head removed from the outboard end.
Figure 7:
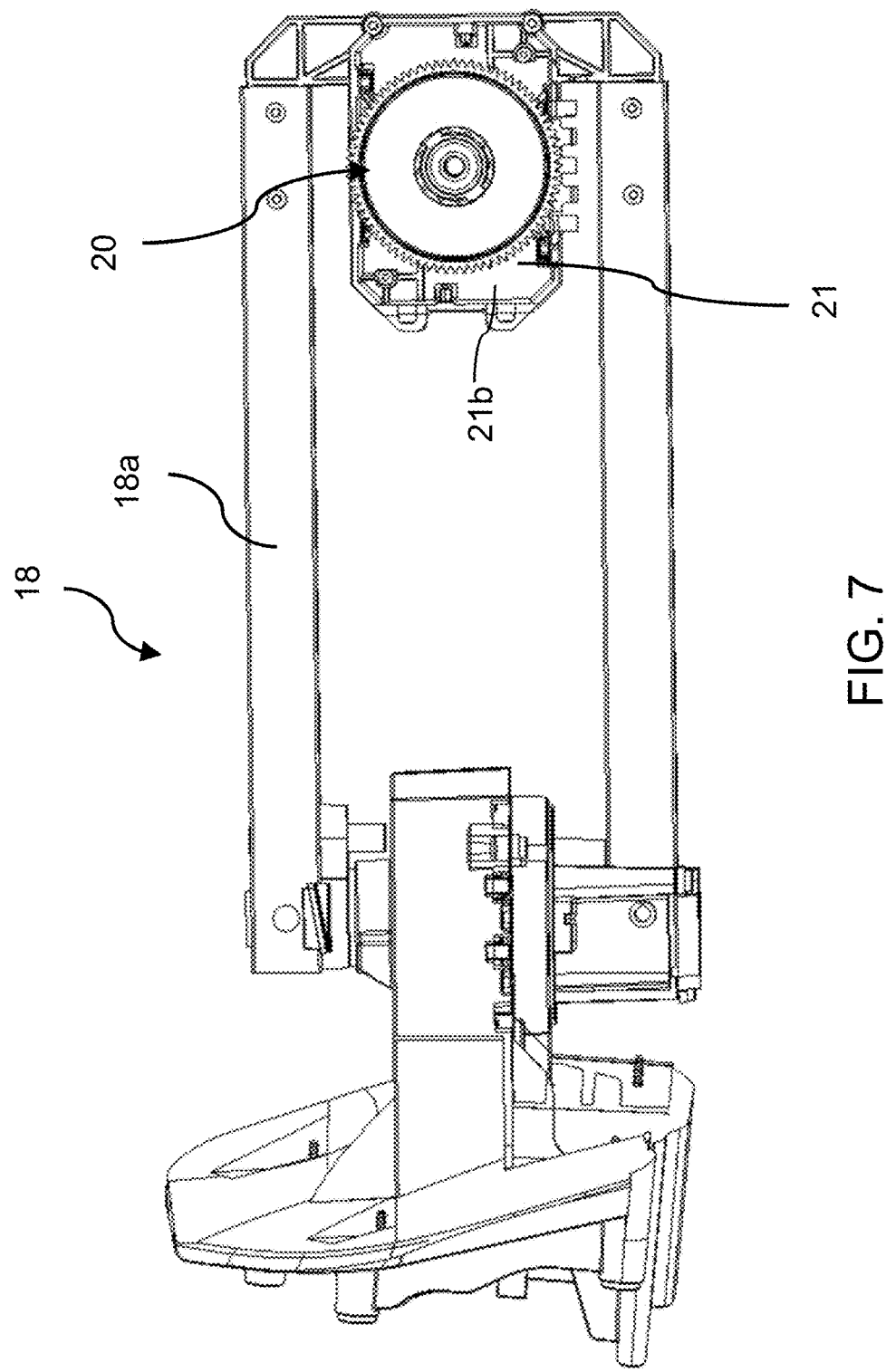
Figure 8:
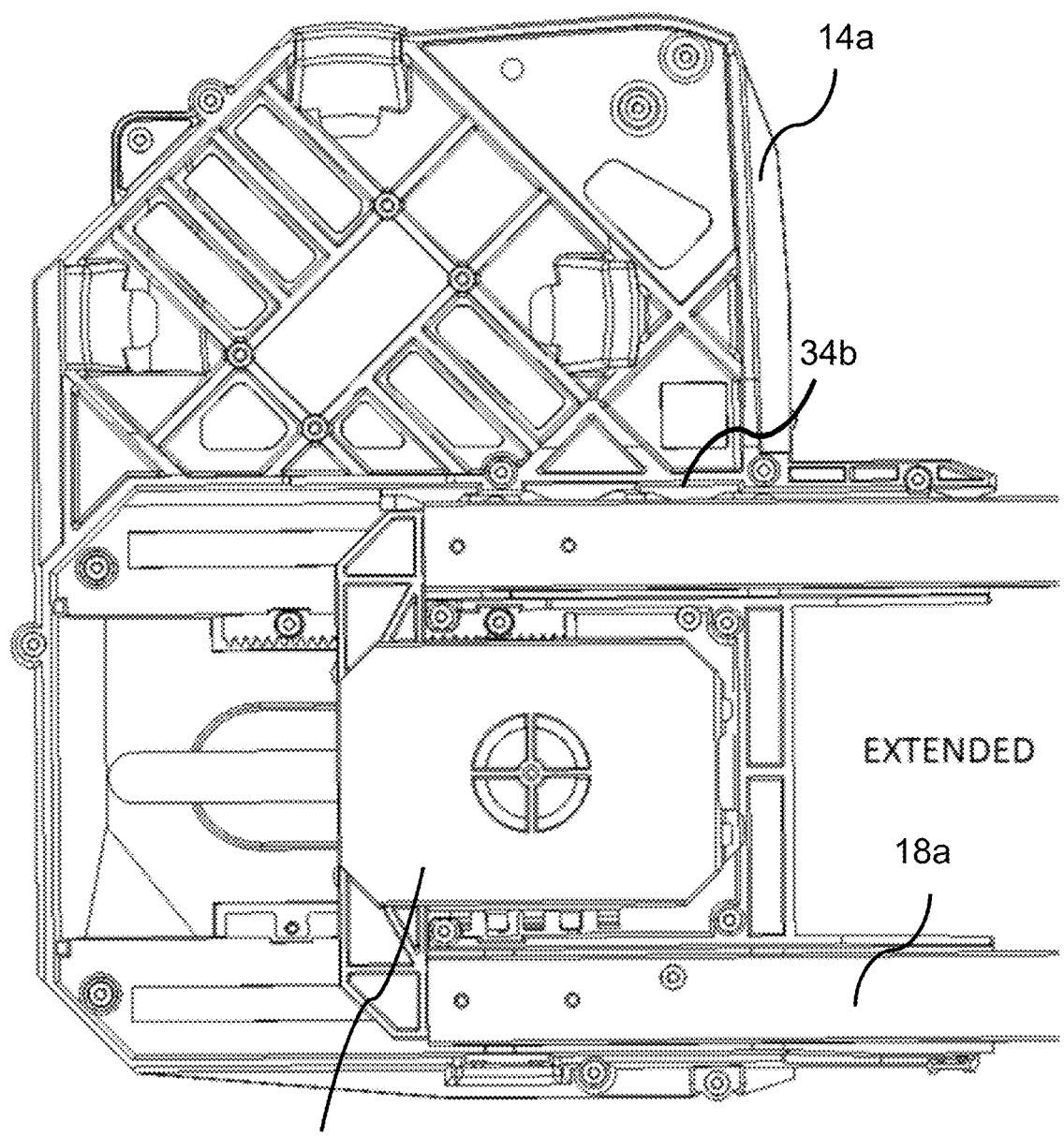
FIGS. 8 and 9 are views of the mirror head bracket, shown in the extended position and the retracted position, respectively.
Figure 9:
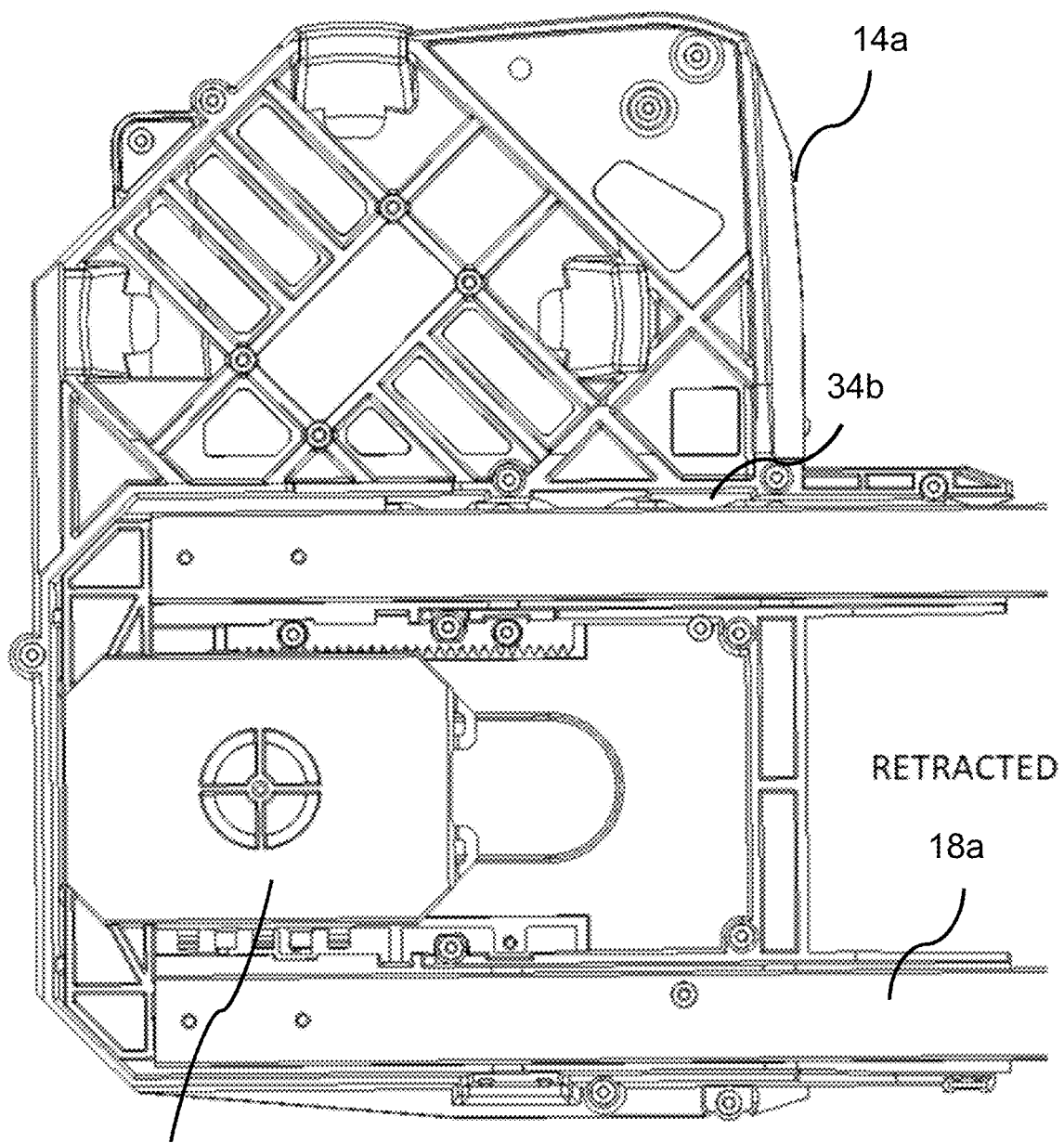
Figure 10:
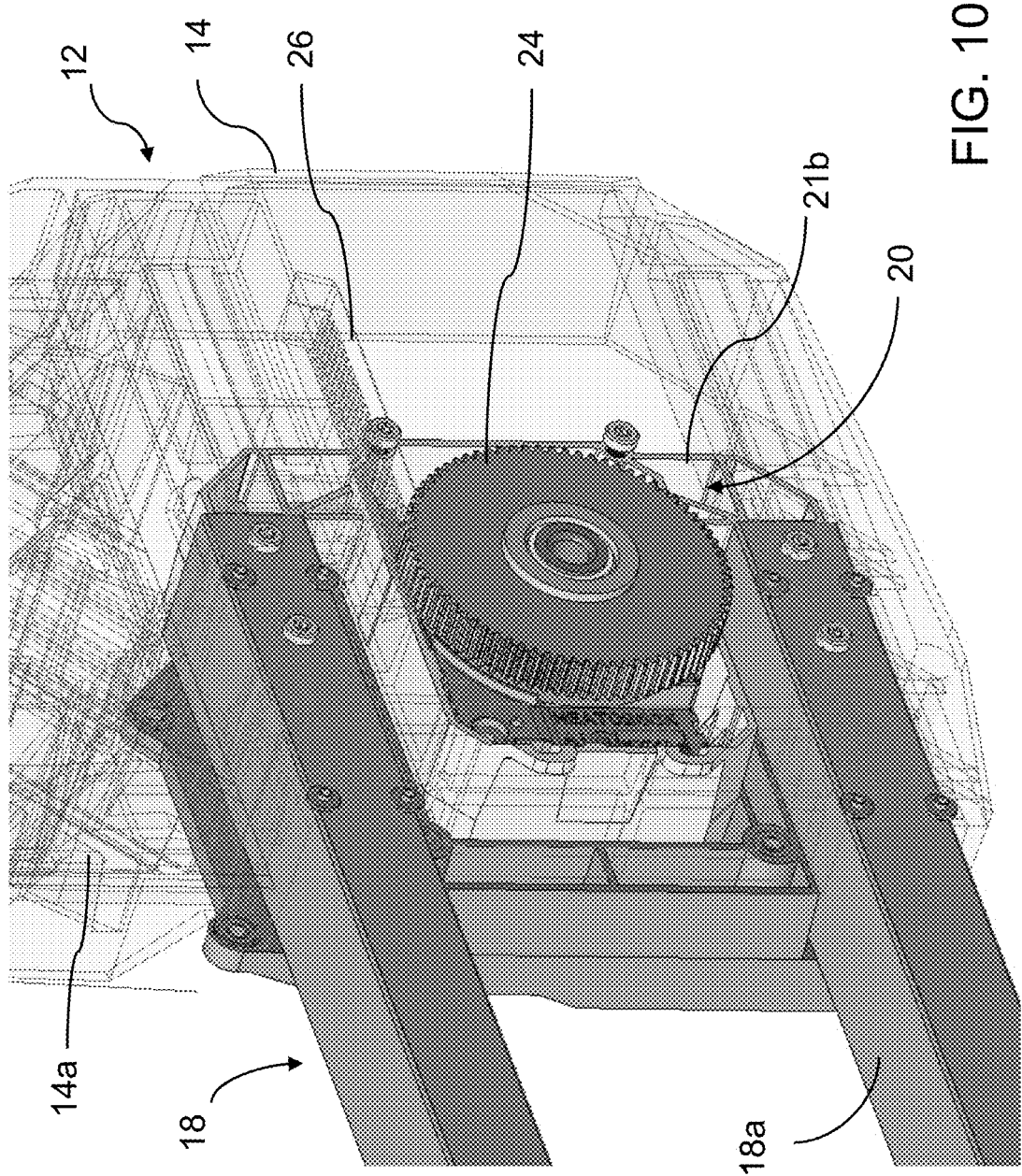
FIG. 10 is a perspective view of the rack and pinion mechanism of the extending and retracting mechanism.

Referring now to the drawings and the illustrative embodiments depicted therein, an exterior rearview mirror assembly 10 for a vehicle includes a mirror head 12 having a mirror reflective element and a mirror shell or casing (with the mounting plate or bracket 14 for the mirror reflective element shown in the drawings), with the mirror head being adjustably mounted at a mounting or support structure or arm 18 and adjustable via an adjustment mechanism or device 20 that adjusts the mirror head between a retracted state (FIGS. 1 and 2) and an extended state (FIGS. 3 and 4). The adjustment mechanism 20 includes a motor 22 (FIGS. 6, 10 and 11) that is operable to rotatably drive a pinion gear 24, which engages a toothed rack 26 such that rotation of the gear 24 causes movement of the rack relative to the motor and thus movement of the mirror head relative to the motor and support structure 18, as discussed below.

In the illustrated embodiment, the support structure 18 comprises a pair of elongated arms or tubes 18a that extend from a base portion, which is configured to attach at a side of a vehicle. The base portion of the mirror assembly is mounted at the side of a host or subject vehicle, with the reflective element providing a rearward field of view along the respective side of the vehicle to the driver of the vehicle.

In the illustrated embodiment, the mirror assembly comprises a powerfold mirror assembly that includes an actuator 28 that is operable to pivot the support structure or arm and the mirror head relative to the base portion. The actuator may operate responsive to a user input to pivot the support arm and mirror head between a use position (as shown) and a folded position, where the arm and mirror head may be disposed generally along the side of the vehicle. Although shown as pivotally mounting at the base portion, such as for a powerfold mirror application (where the support structure or arm and the mirror head may be pivoted relative to the base portion via an actuator assembly or adjustment device) or breakaway mirror application, the support arm or structure may be fixedly mounted at a base portion or at the side of the vehicle.

Figure 5:
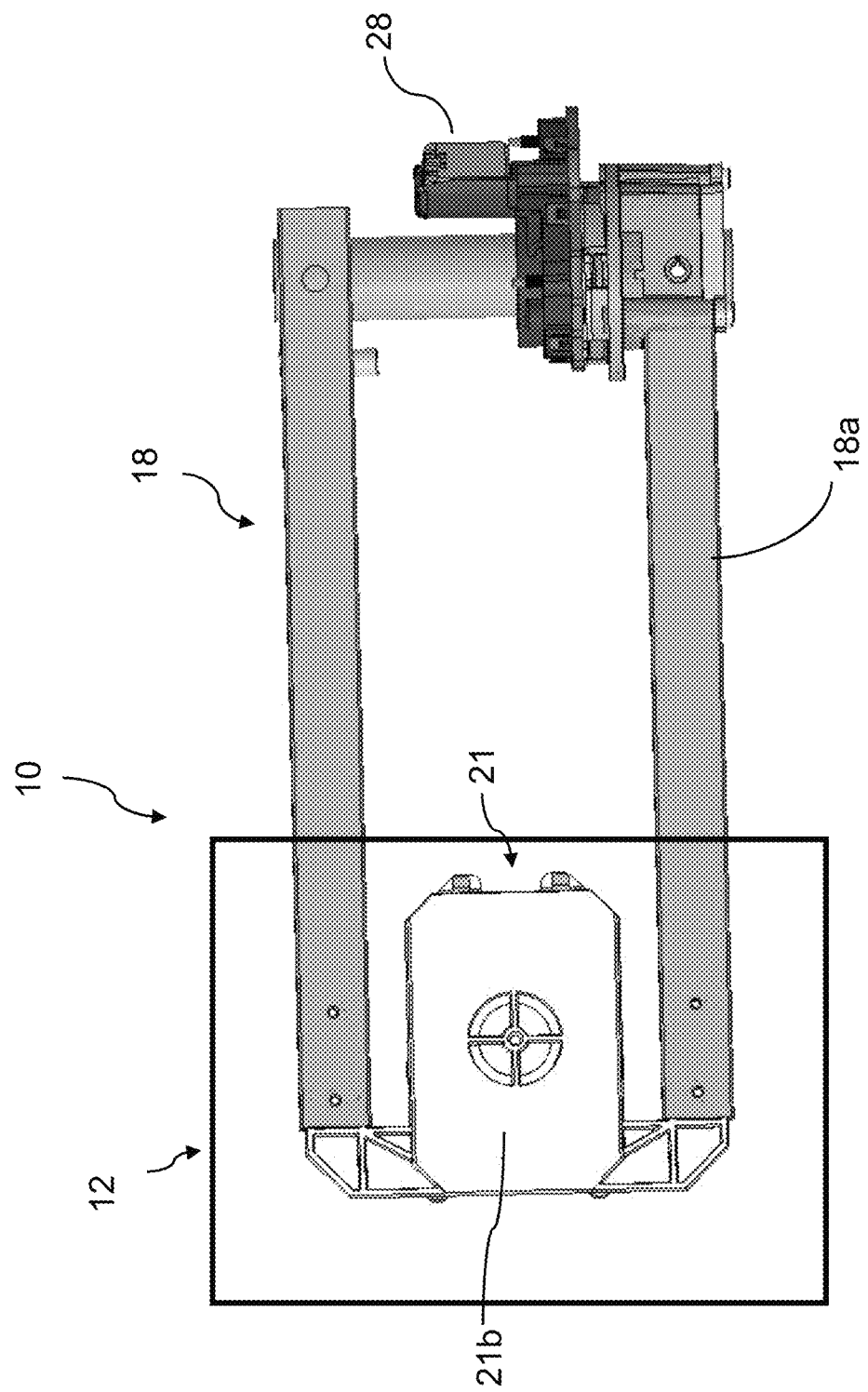
FIG. 5 is a view of the extending and retracting mechanism, with the mirror head removed from the outboard end.

The mounting or support structure 18 supports or houses the adjustment mechanism 20 at the outer end of the arms 18a, with the adjustment mechanism 20 attached at the ends of the arms to form a closed ended structure at the outboard end of the arms, such as best shown in FIG. 5. The arms or tubes 18a are thus joined together by a bracket component 21 of the adjustment mechanism at the ends of the arms or tubes to create a closed shape instead of an open ended tuning fork type configuration. In the illustrated embodiment (and such as can be seen with reference to FIG. 10), the bracket 21 includes a pair of tabs or arms 21a that are received in the respective ends of the arms or tubes 18 and fastened thereat (and/or optionally snapped or press-fit therein) to secure the bracket and the adjustment mechanism at the ends of the arms. The bracket 21 also includes a support structure 21b that spans between the arms 21a and that supports or accommodates the adjustment or drive mechanism 20.

The bracket 21 and the outer portions of the arms 21a are received in the mirror head bracket 14 of the mirror head (such as between a front mirror head bracket portion 14a and a rear mirror head bracket portion or cover portion 14b that are fastened together to retain the arms therein) and are slidable or movable relative to the mirror head bracket 14. The mirror head bracket 14 includes the toothed rack 26 (which may be formed as part of the mirror head bracket or housing bracket or may be a separate part that is fixedly attached at the mirror head bracket) that is engaged by the toothed gear 24 of the adjustment mechanism 20. As can be seen with reference to FIG. 11, the adjustment mechanism support structure 21b (of the bracket 21) is received in a passageway of the mirror head bracket 14 (defined by and between the front bracket portion 14a of the mirror head bracket 14 and the cover portion 14b of the mirror head bracket 14, with the rack 26 disposed along an upper (or lower) region of the passageway.

Thus, when the motor 22 is actuated to rotate the pinion 24, rotation of the pinion (which engages the toothed track 26) causes the track and the mirror head bracket 14 (and the mirror head) to move along the arms 18a between the extended position and the retracted position. The mounting or support arms and the adjustment mechanism remain fixed at the ends of the tubes, while the mirror head moves inboard or outboard, depending on the rotational drive direction of the motor and pinion, with the mirror head bracket having clearance therein to allow for the relative movement of the mirror head bracket and the adjustment mechanism bracket.

Figure 11:
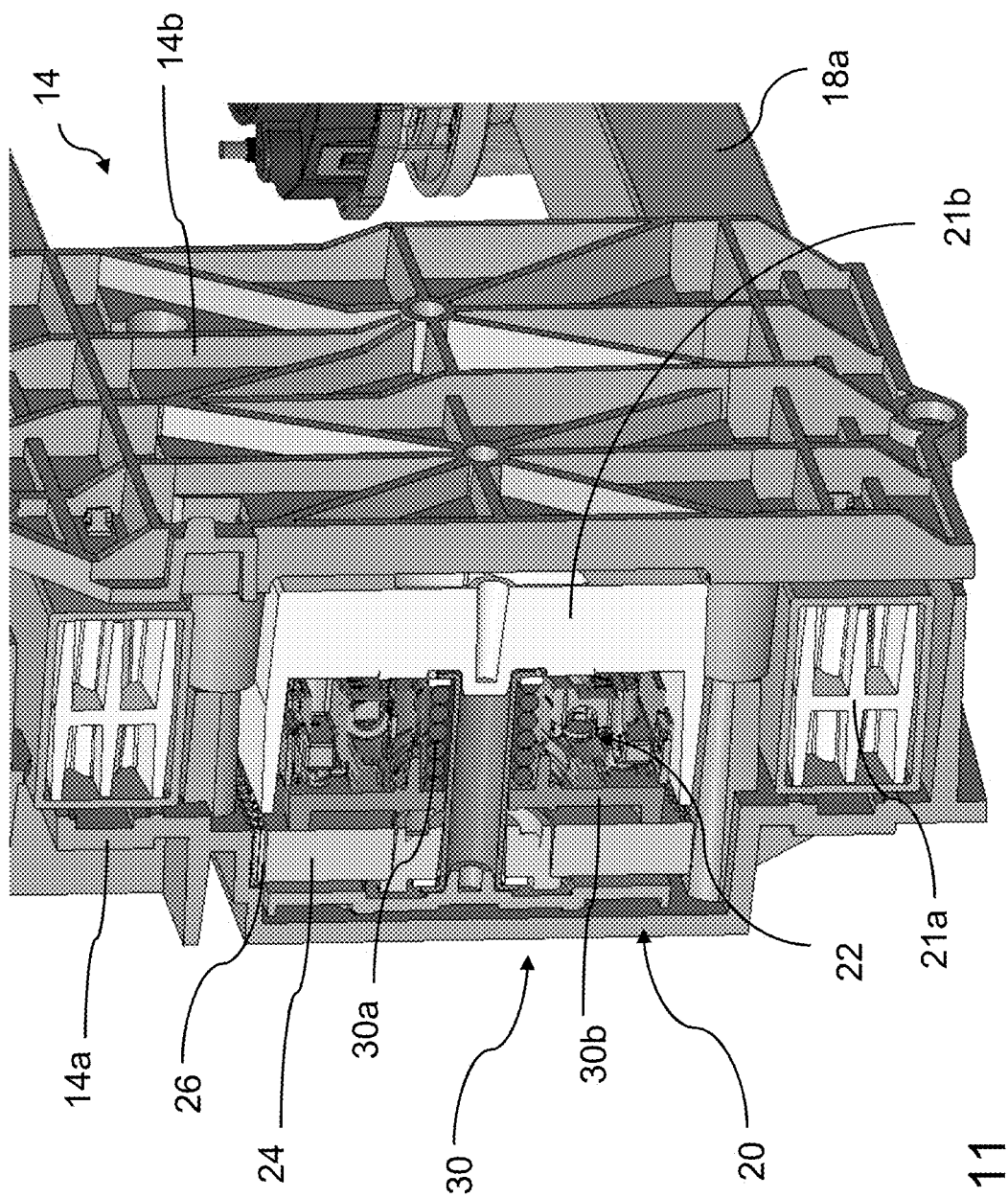
FIG. 11 is a perspective and partial sectional view of the mechanisms of FIG. 10.

Optionally, and such as shown in FIG. 11, the adjustment mechanism 20 may include a clutch drive 30 that functions to allow for slippage to allow for manual movement (extension or retraction) of the mirror head along the arms 18a. The clutch drive 30 comprises a spring 30a that urges a clutch plate 30b into engagement with the gear 24 such that rotational driving of the clutch plate rotationally drives the gear. The clutch plate is connected to the output gear of the motor of the actuator, such as by interlocking lugs. The clutch plate transfers torque (and rotational motion) to the pinion or gear from the actuator via friction between the pinion and clutch plate surfaces (provided by the force from the spring). The clutch allows for slippage between the pinion and the clutch plate when the force being exerted on the pinion by the rack (located on the sliding head bracket) is greater than the torque between the pinion and clutch plate. This causes the pinion to rotate relative to the clutch plate, such that the mirror can be extended/retracted manually.

Figure 12:
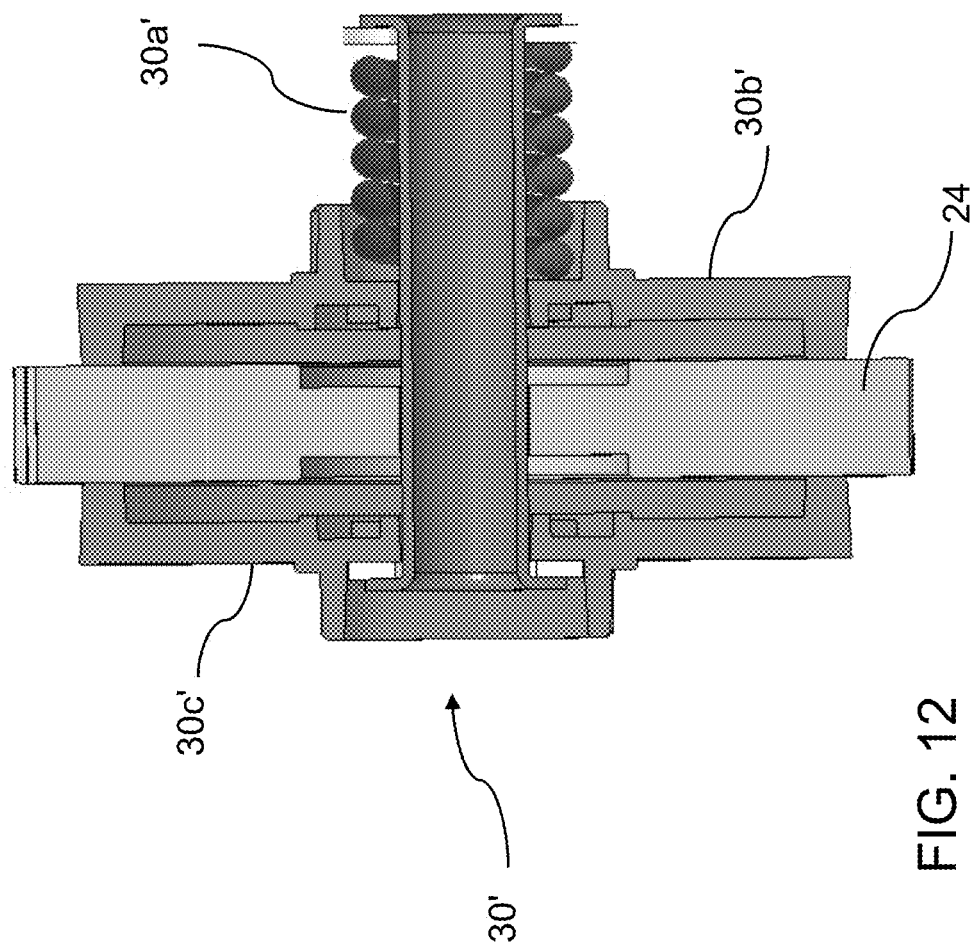
FIG. 12 is a sectional view of a two-sided clutch mechanism for the extending and retracting mechanism.
Figure 13:
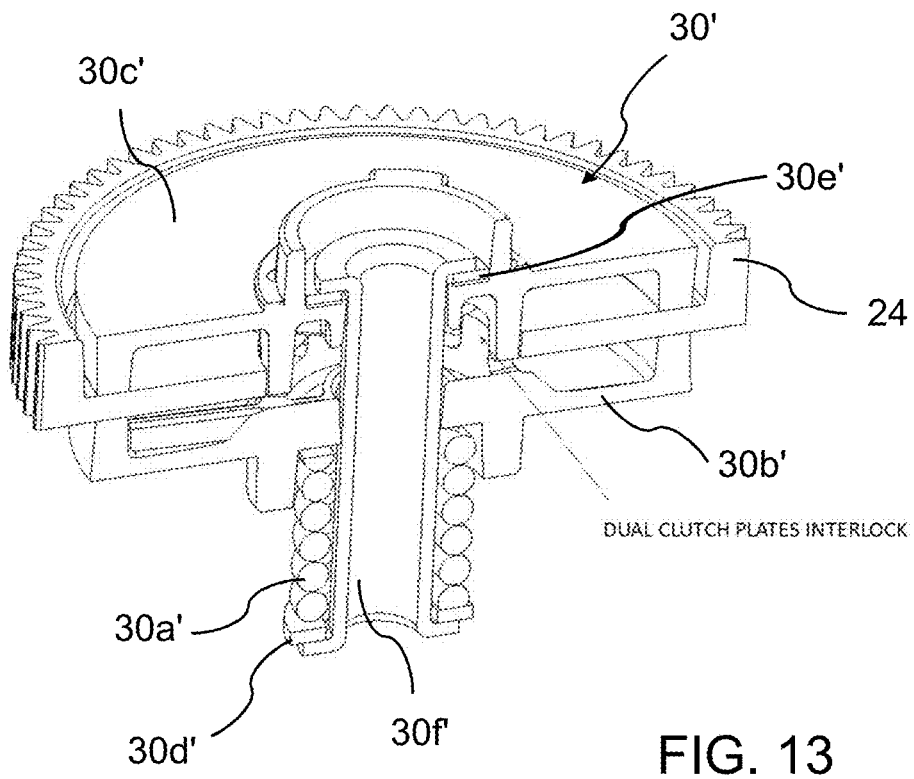
FIG. 13 is a perspective and partial sectional view of another clutch mechanism, with the clutch mechanism having dual clutch plates that engage the output gear of the extending and retracting mechanism.
Figure 14:
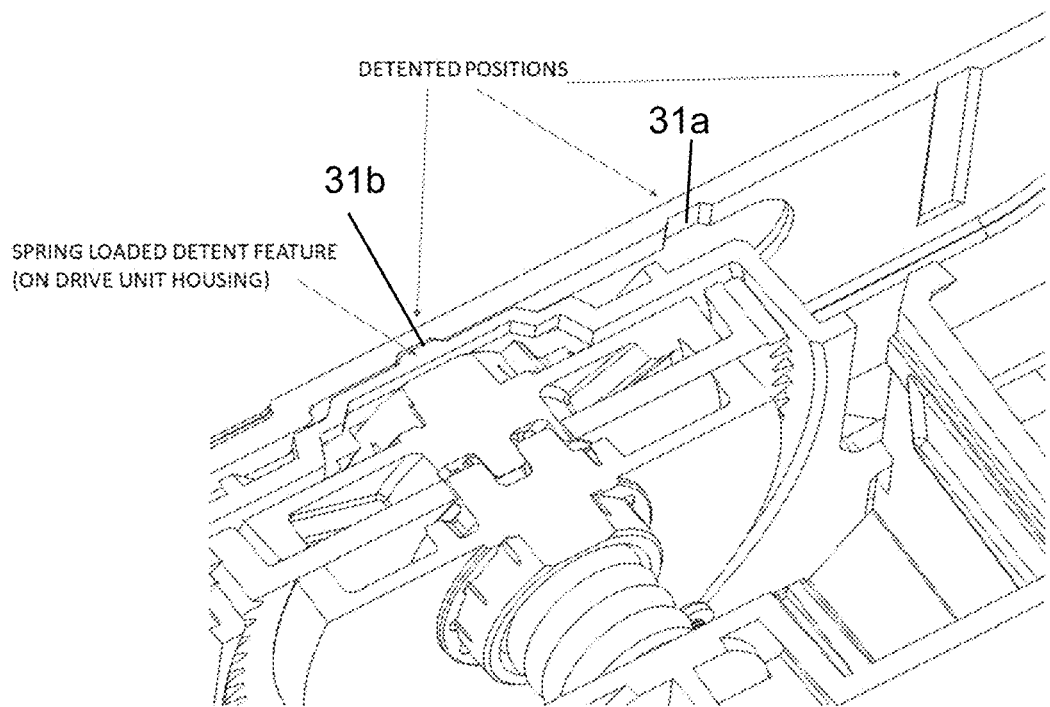
FIG. 14 is another perspective and partial sectional view of the clutch mechanism of FIG. 13, shown in the extension/retraction mechanism, with the end of the clutch mechanism engaging detent positions.

Optionally, and such as shown in FIGS. 12-14, the clutch drive 30' may comprise a two-sided clutch having two clutch plates 30b', 30c' that are urged (via the spring 30a') against the opposite sides of the gear 24 to rotatably drive the gear and that allow for slippage of the gear or pinion relative to the clutch plates when the force or torque applied at the pinion or gear is sufficient to overcome the frictional force applied by the clutch plates (via the spring) that are pressing against opposite sides of the gear. The dual clutch plates 30b', 30c' interlock (such as shown in FIG. 13) to rotate together for driving the gear 24. The clutch subassembly is assembled to the output of the power extend actuator (e.g., an output drive shaft or gear that is rotatably driven by the motor). As shown in FIG. 13, the clutch assembly 30' includes a slip washer 30d', the spring 30a', the first clutch disk or plate 30b', the drive gear 24, the second clutch disk or plate 30c', another slip washer 30e', with all of these components held together by a rivet tube 30f'. The first clutch plate 30b' may be interlinked to the output of the extend actuator in the same way that a detent plate is interlinked to the output of a power fold actuator. The first clutch plate 30b' and the second clutch plate 30c' are rotationally interlinked by a set of mating lugs. The drive gear 24 is encased on either side by the first and second clutch plates.

Optionally, and such as shown in FIG. 14, a detent mechanism may be implemented into either a power extend or manual extend system. In the illustrated embodiment, there are three detent grooves or notches 31a located in the mirror head housing bracket and one detent bump 31b located on the drive unit housing. As the mirror head slides along the tubes, the detent bump (stationary to the tubes) can engage with any of the detent grooves in the housing bracket. This system provides a positive feedback to the user that the mirror is in a designated stopping location in a manually extended system. The detent positions thus may be added to the system between the drive unit housing (or tube connecting bracket in the case of a manual extend only mirror) and the main mirror bracket. The detent grooves can be added directly to the mirror bracket, and corresponding detent feature can be molded as part of the drive unit housing/tube connecting bracket. The detent system may rely on the stiffness of the molded material to provide resistance to the detent, or a separate detent assembly (including, for example, a spring and a hinged detent flap) may be assembled to the drive unit housing/tube connecting bracket.

Figure 15:
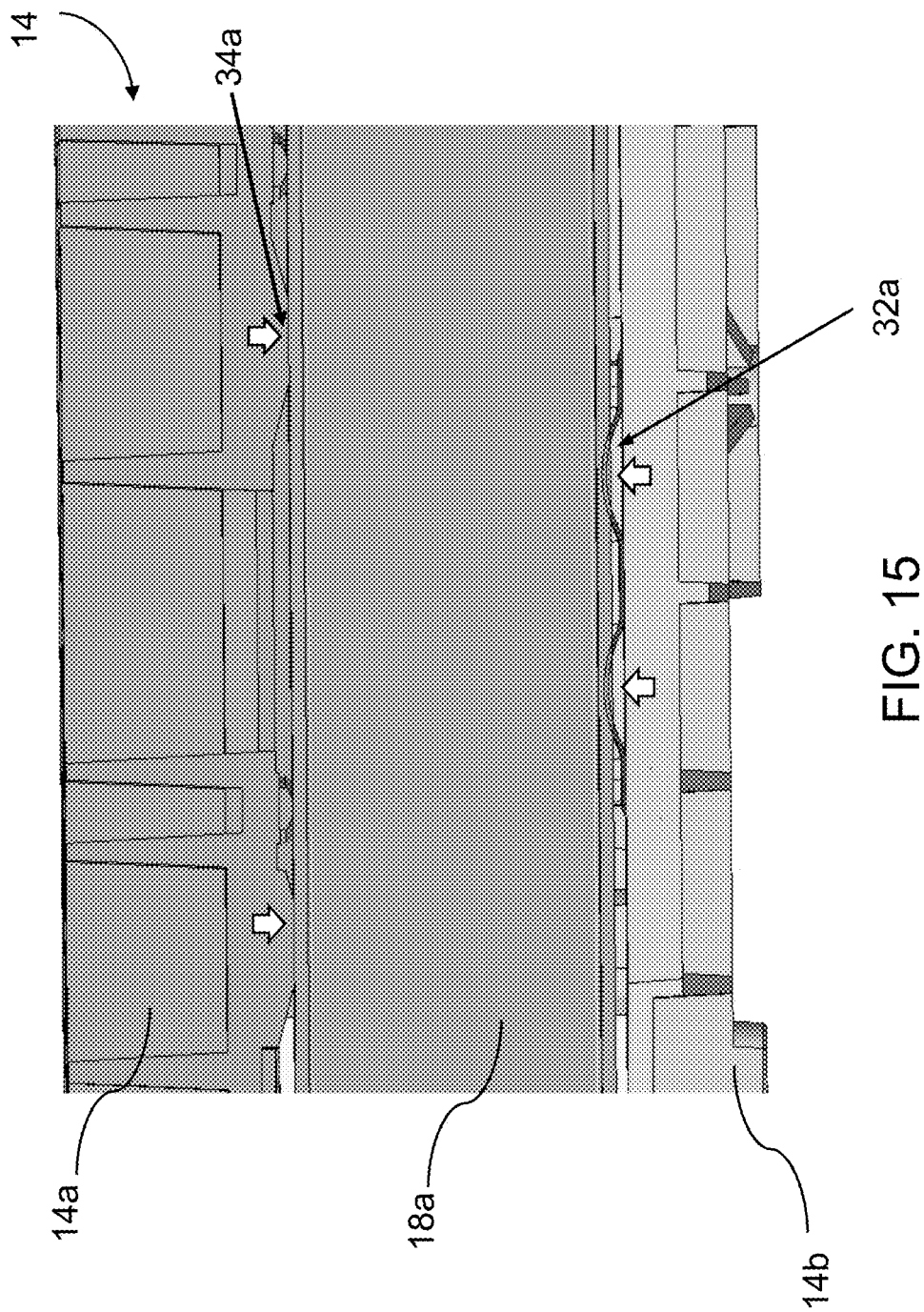
FIG. 15 is a sectional view showing slidable engagement of the mounting or support arm with the mirror head bracket.
Figure 16:
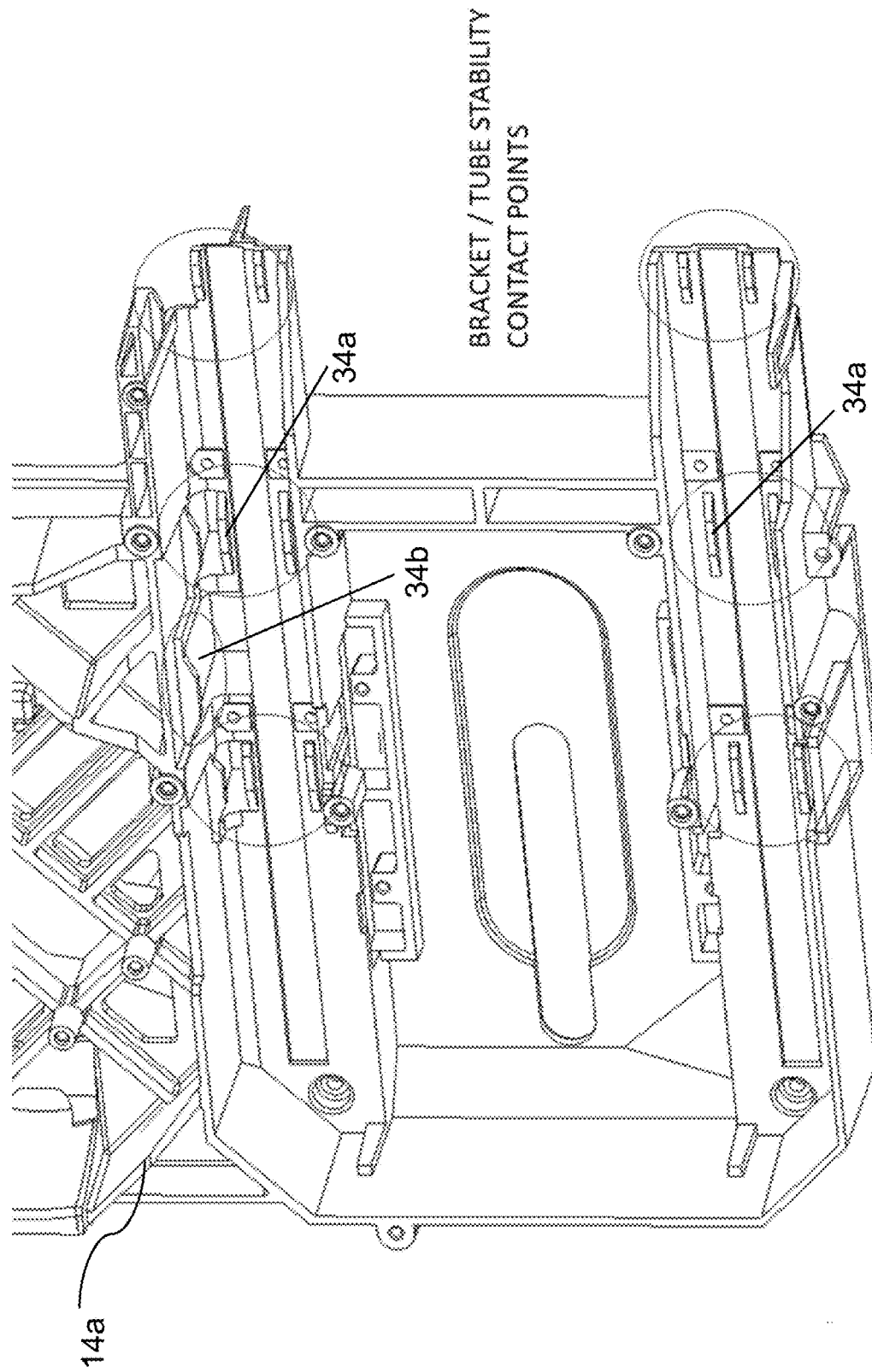
FIG. 16 is a perspective view of the front part of the mirror head bracket, showing bracket and tube contact points.
Figure 17:
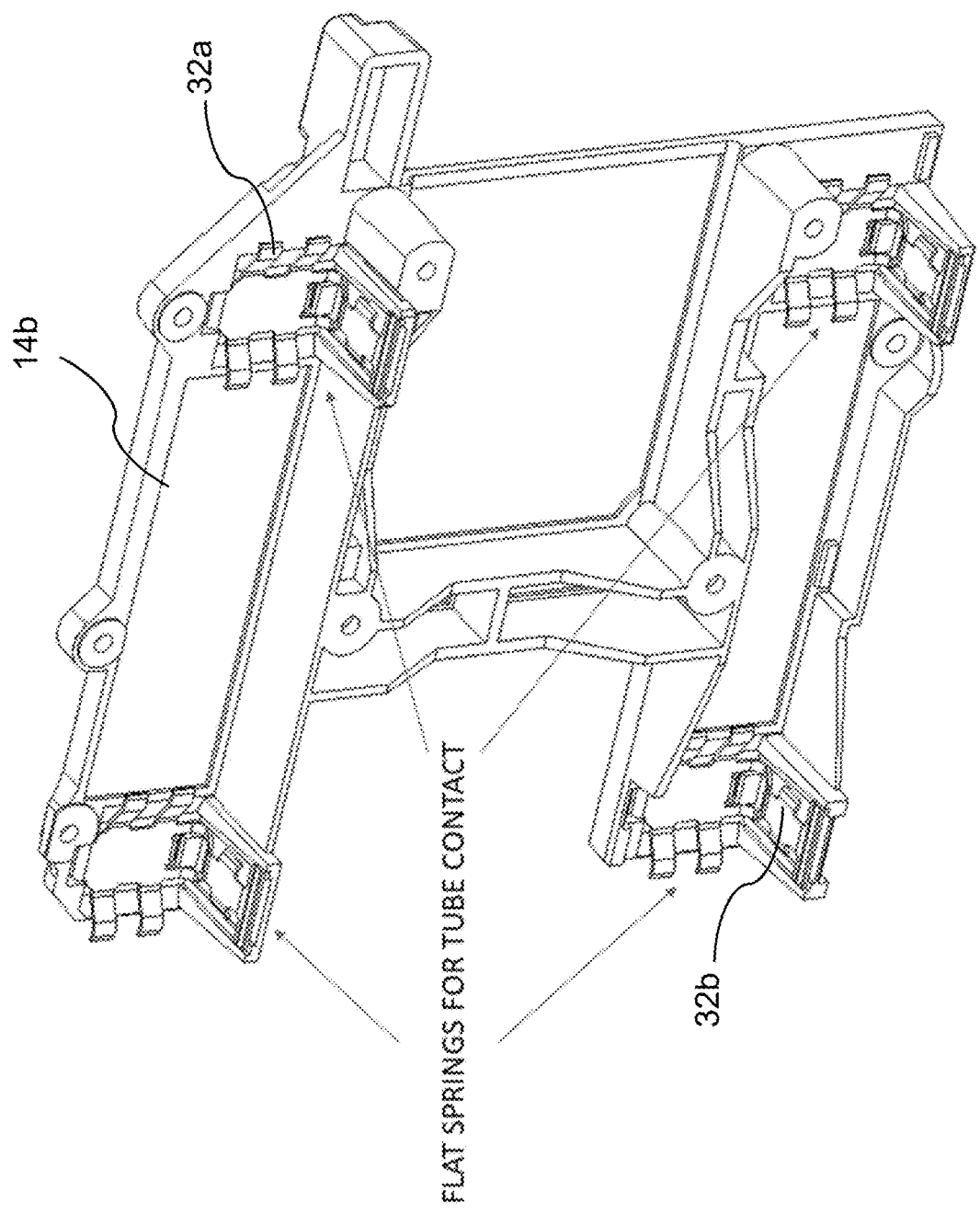
FIG. 17 is a perspective view of the a rear part or cover portion of the mirror head bracket, showing flat springs for contacting the tubes.
Figure 18:
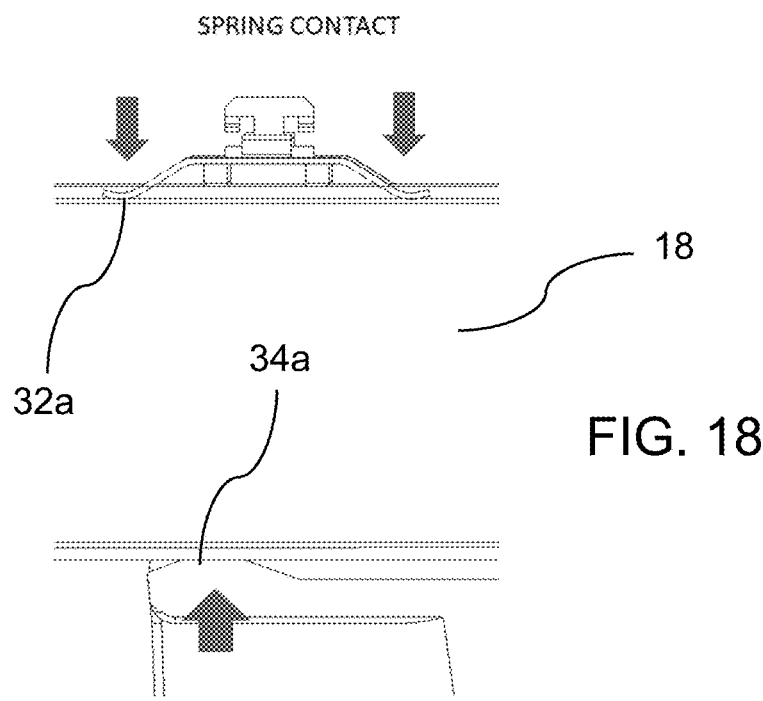
FIGS. 18 and 19 are enlarged views of the spring contacts of the bracket for engaging the tubes.
Figure 19:
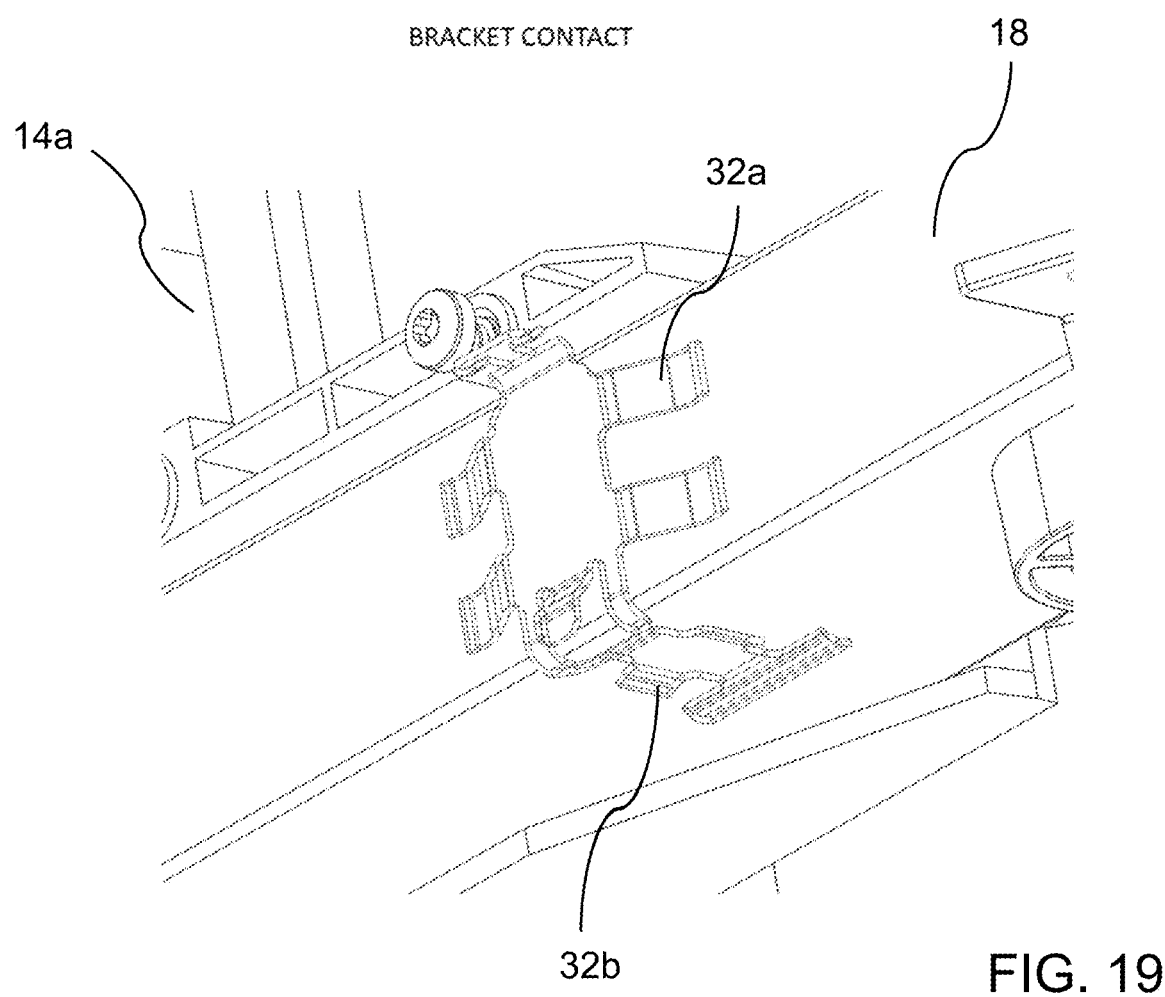
Figure 20:
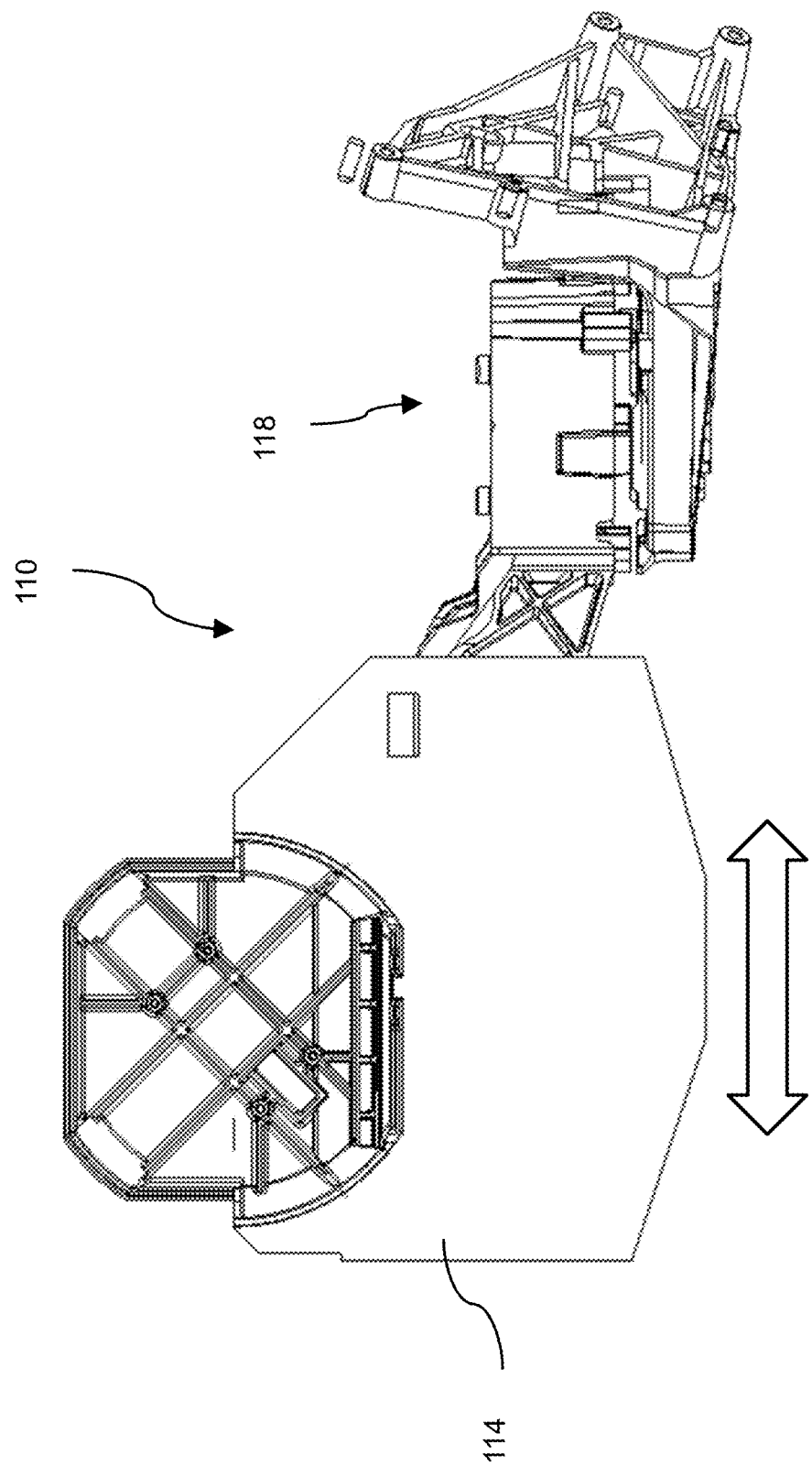
FIG. 20 is a view of another mirror assembly, shown with the mirror head removed, and having a single arm mounting or support structure for mounting the mirror head at the side of the vehicle.
Figure 21:
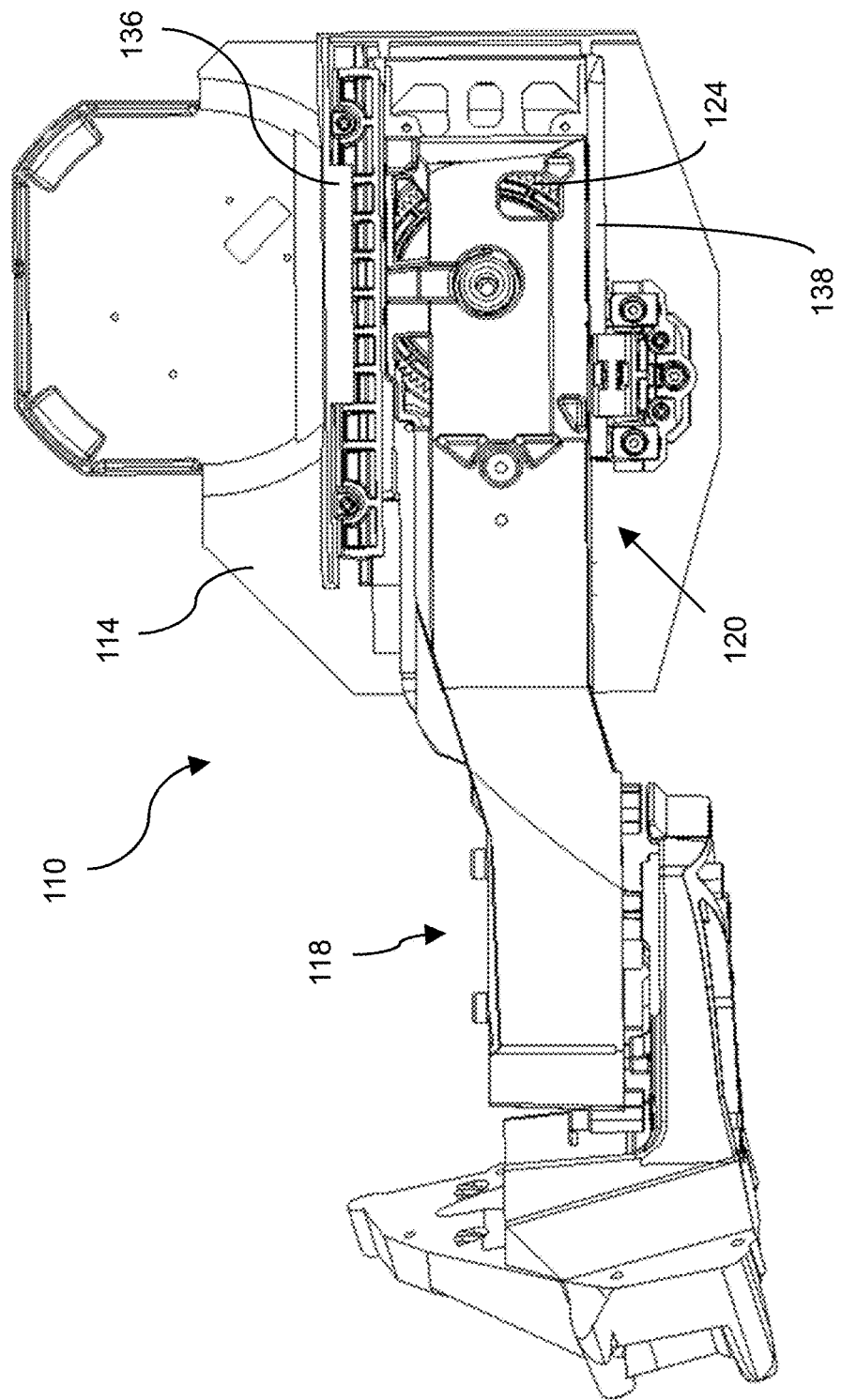
FIG. 21 is another view of the mirror assembly, shown with the mirror head removed.
Figure 23:
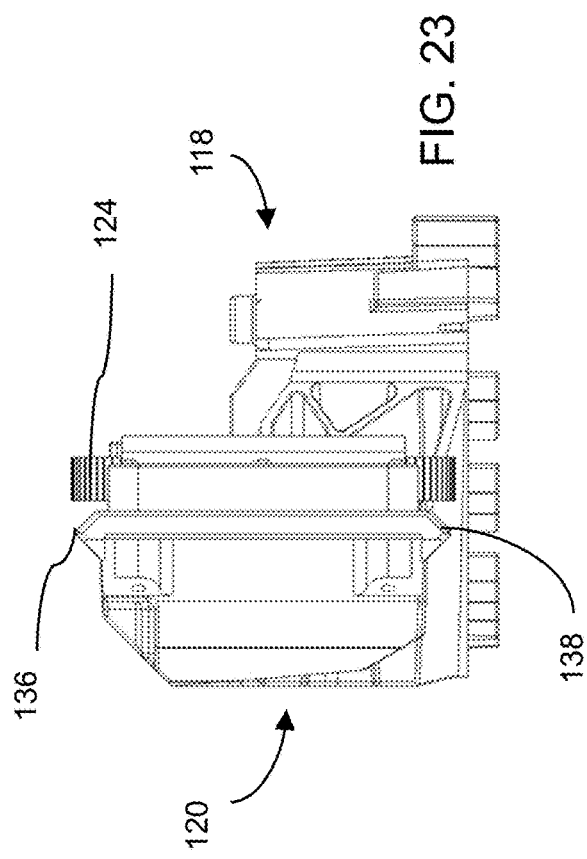
FIG. 23 is an end view of the support arm and actuator assembly of FIG. 22.
Figure 22:
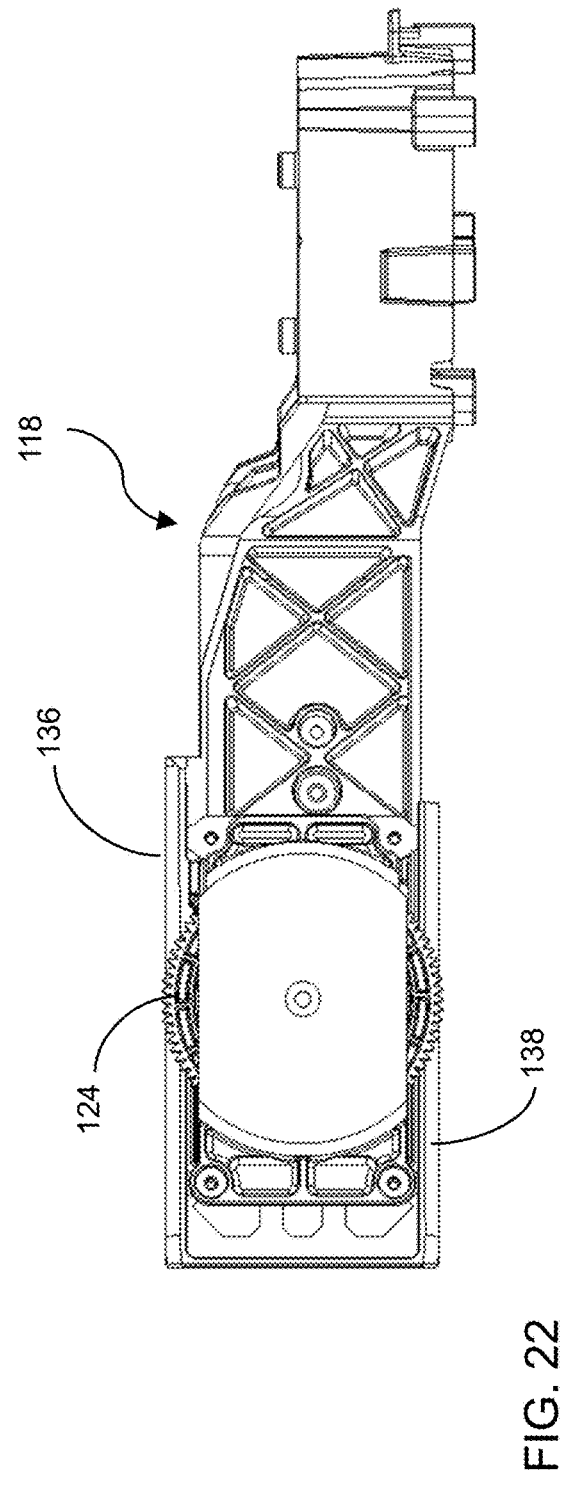
FIG. 22 is a view of the support arm and actuator of the mirror assembly of FIG. 20.
Figure 26:
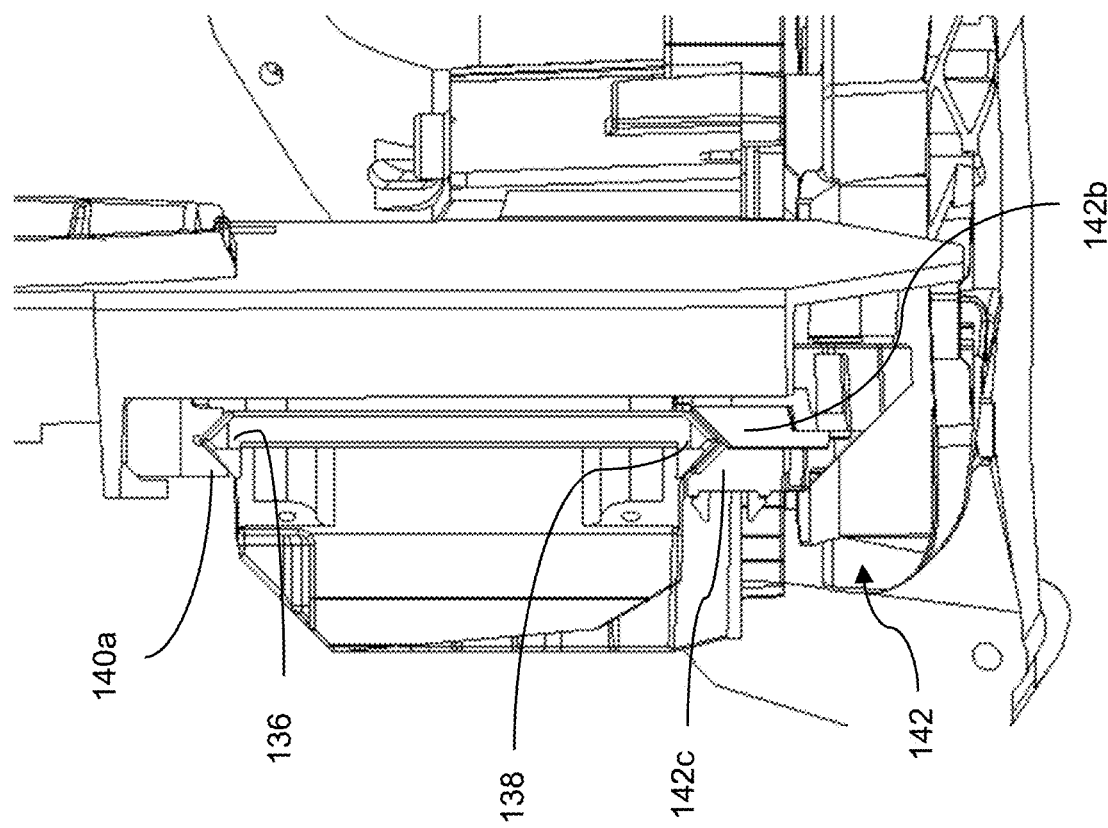
FIG. 26 is an end view of the mirror assembly.
Figure 27:
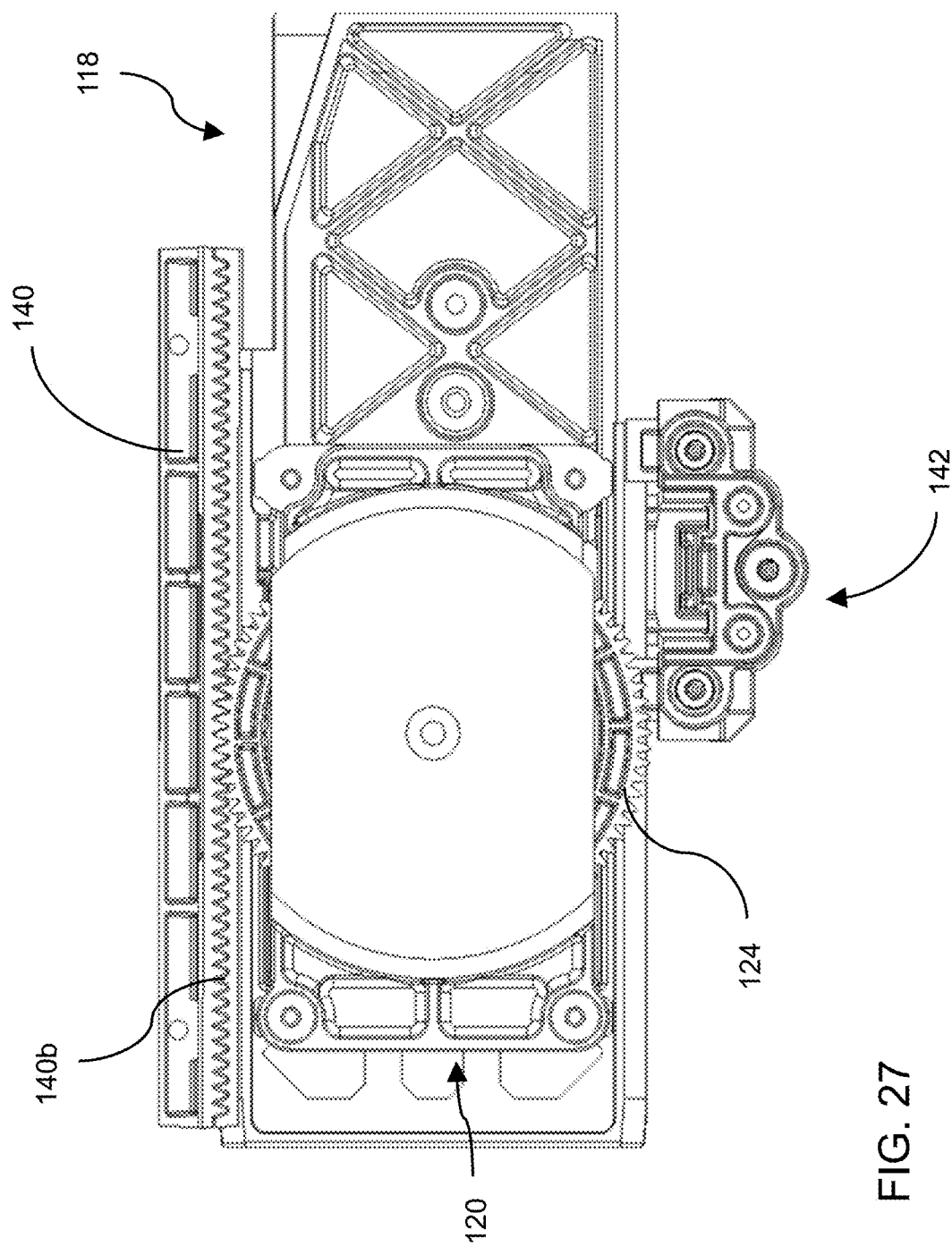
FIG. 27 is another view of the mirror assembly, shown with portions removed to show the engagement of the actuator gear with the toothed rack.
Figure 28:
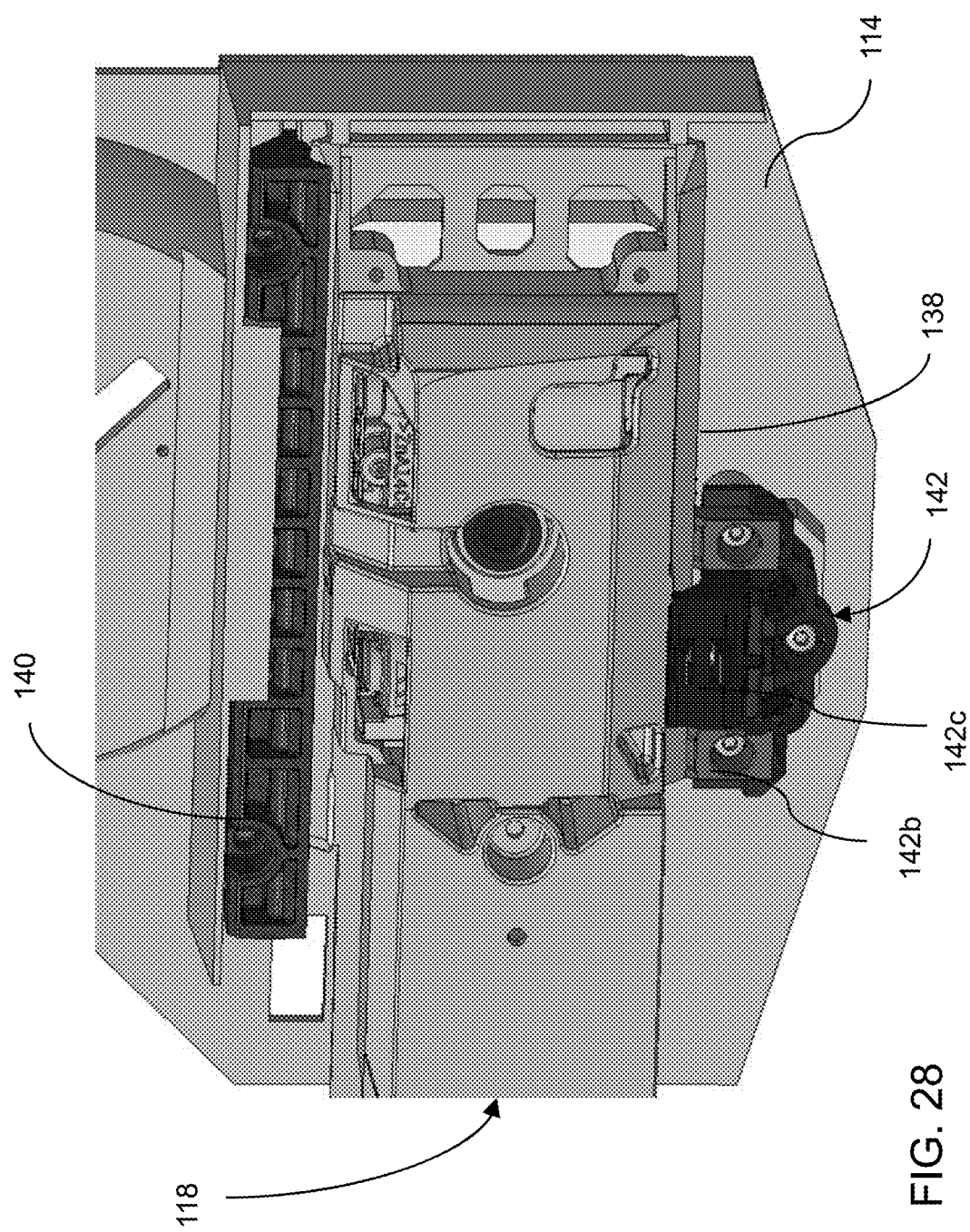
FIG. 28 another view of the mirror assembly, showing the interface between the mirror head bracket and the upper and lower rails of the arm and actuator.
Figure 29:
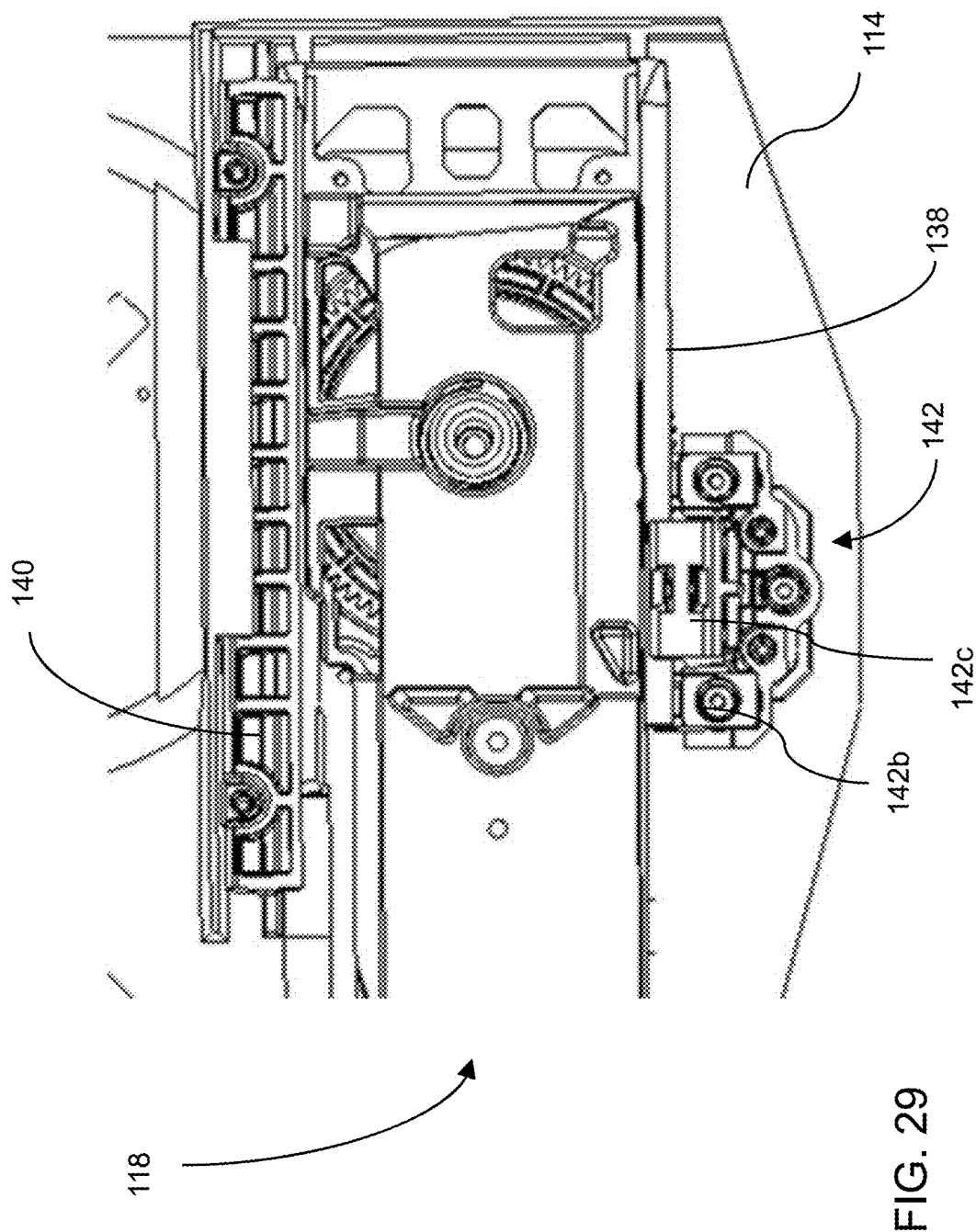
FIG. 29 is another view of the mirror assembly of FIG. 28.
Figure 33:
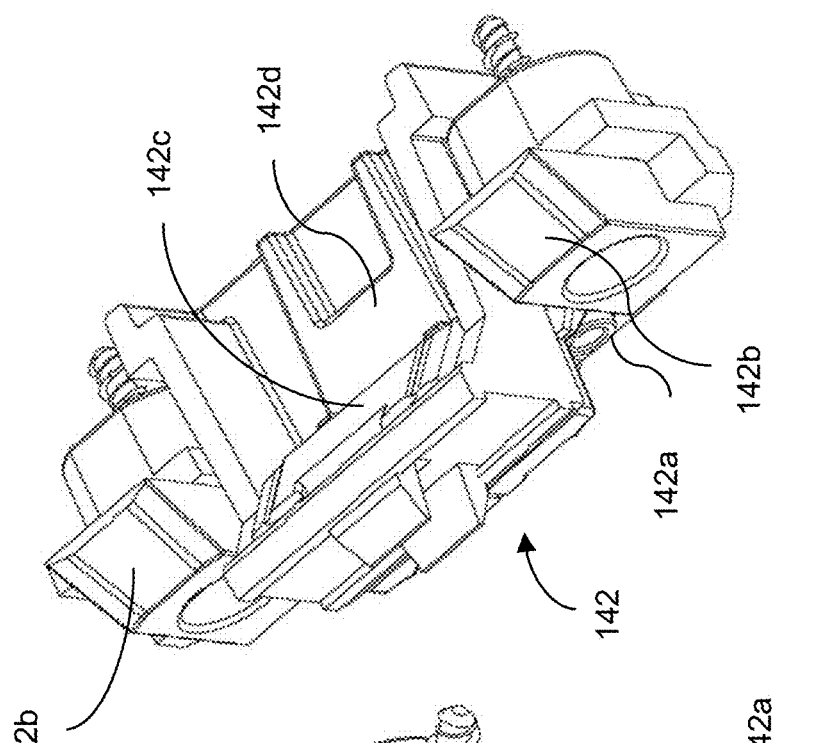
FIGS. 32 and 33 are perspective views of the lower bracket that interfaces with the lower rail.

The bracket 21 and the support arms 18a thus are slidably received in and along a passageway of the mirror head bracket 14 (with the passageway defined when the front and rear mirror head bracket portions 14a, 14b are joined together). Optionally, and such as shown in FIGS. 15-17, the support arms 18a may slidably engage part of the mirror head bracket 14 (such as at and along one side or portion 14a of the bracket 14) and may slidably engage a flat wire spring 32 disposed along the other part 14b of the mirror head bracket 14 (such as at and along the cover portion or rear bracket portion 14b of the bracket 14). As shown in FIG. 16 (showing the front mirror head bracket portion, with the rear bracket portion removed), the front bracket portion 14a provides generally U-shaped channels for receiving the arms therein, and may include a plurality of raised bumps or protrusions 34a disposed along a forward surface of the channel and a plurality of bumps or protrusions 34b disposed along an upper and/or lower surface of the channel. As shown in FIG. 17, the rear mirror head bracket portion or cover portion 14b includes flat spring contact portions 32a disposed at a rear portion of the passageway (that is formed when the rear cover portion is attached at the mirror head bracket portion) and flat spring contact portions 32b disposed along the upper or lower portion of the passageway. Thus, and such as shown in FIG. 18, the spring contacts 32a engage one side of the arm 18a while the other side of the arm 18a is in contact with the protrusions 34a. Likewise, and such as shown in FIG. 19, the lower spring contact 32b of the cover portion 14b (not shown in FIG. 19) may engage the lower surface of the arm 18a, while the upper surface of the arm may engage the protrusions 34b of the mirror head bracket portion 14a.

The arms or tubes thus are constrained against the housing bracket 14a on one side by solid contact points (such as bumps or protrusions or solid touch pads of the bracket portion 14a along the passageway), and on the other side by the flat wave springs. Optionally, the mirror head (or the mounting or support structure) may comprise rollers or ball bearings to engage the support structure (or the mirror head) to align the mirror head bracket relative to the support arms and to allow for movement of the mirror head bracket relative to the support arms. Optionally, the adjustment mechanism may comprise a detent plate in place of the clutch plate to drive the pinion, such that the mechanism provides detented or preselected or predetermined positions for the mirror head to be adjusted to that are at and between the fully retracted position and the fully extended position.

The adjustment mechanism 20 (comprising the actuator and clutch mechanism) is attached at the bracket 21, such that the mechanism and bracket are mounted at the ends of the tubes as a drive unit. The mirror head bracket 14 is attached at and partially encases the tubes and the drive unit by joining the front mirror head bracket portion with the rear mirror head bracket portion.

Although shown and described as having a rack and pinion extension/retraction system of a twin arm or dual arm mirror assembly, the mirror assembly may comprise a single arm design, with a rack and pinion extension/retraction system or mechanism. For example, and with reference to FIGS. 20-35, an exterior rearview mirror assembly 110 for a vehicle includes a mirror head having a mirror reflective element and a mirror shell or casing (with the mounting plate or mirror head bracket 114 for the mirror head shown in the drawings), with the mirror head being adjustably mounted at a mounting or support structure or arm 118 and adjustable via an adjustment mechanism or device 120 that adjusts the mirror head between a retracted state and an extended state. The adjustment mechanism 120 includes a motor that is operable to rotatably drive a pinion gear 124, which engages a toothed rack 126 such that rotation of the gear 124 causes movement of the rack relative to the motor and thus movement of the mirror head relative to the motor and support structure 118.

The support arm 118 supports the adjustment mechanism or actuator 120 and has an upper rail 136 and a lower rail 138 (FIGS. 22 and 23), along which the mirror head bracket 114 moves via engagement of the upper rail 136 and lower rail 138 with an upper slider portion 140 and a lower slider portion 142, respectively, of the mirror head bracket 114 (FIGS. 26-35). The upper and lower contact rails on the arm bracket are contact points for the mirror head bracket 114, and the mirror head bracket rides along these rails when the adjustment mechanism is electrically operated to extend or retract the mirror head relative to the support arm and the side of the vehicle at which the mirror assembly is mounted.

The upper slider portion 140 is attached at the mirror head bracket, such as via a pair of fasteners or other suitable attachment means. In the illustrated embodiment, the upper slider portion 140 of the mirror head bracket 114 comprises a V-shaped groove or channel 140a (see FIGS. 26, 30 and 33) that slidably receives the V-shaped upper rail 136 therein. The upper slider portion 140 also includes a linear gear or toothed element or rack 140b disposed along one side of the channel 140a. The geared rack engages the teeth of the gear or pinion 124, such that rotation of the pinion 124 imparts translational movement of the upper slider portion 140 (and the lower slider portion 142 and the mirror head bracket 114) relative to the pinion 124 and support arm 118.

Figure 32:
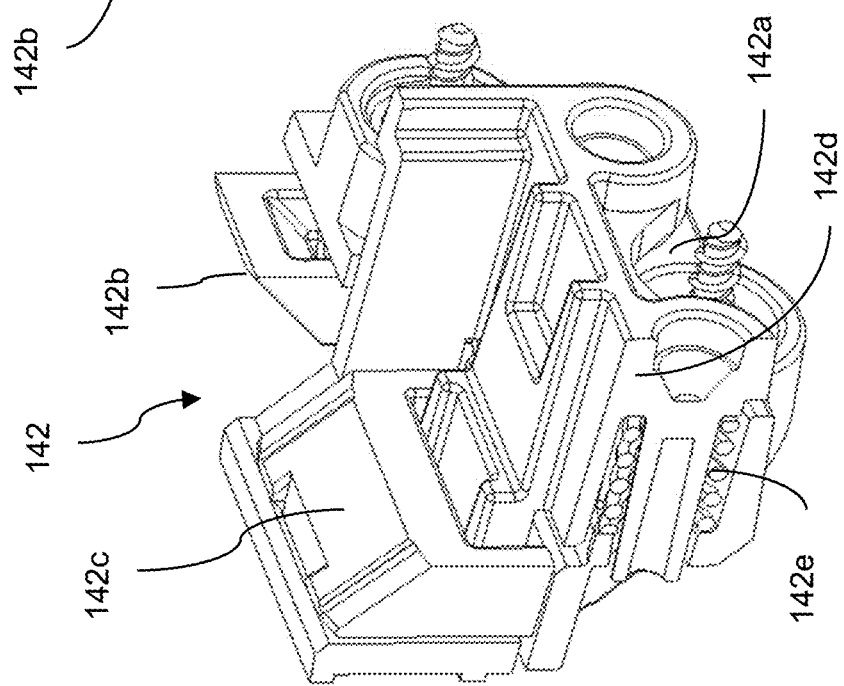

The lower slider portion 142 is attached at the mirror head bracket 114, such as via a plurality of fasteners or other suitable attachment means. The lower slider portion 142 comprises a spring-loaded or spring-tensioned assembly having one or more (such as two spaced apart) stationary low-friction pads rigidly mounted at the mirror head bracket 114, and one or more movable low-friction pad held in compression against the opposing side of the lower rail 138. In the illustrated embodiment, the lower slider portion 142 comprises a base portion 142a having a pair of fixed or stationary pads or elements 142b disposed thereat, with a movable spring-loaded or spring-tensioned pad or element 142c movably disposed at the base portion 142a (see FIGS. 28, 29 and 32-35). As shown in FIG. 32, the movable pad 142c is disposed at a movable portion 142d that is slidably disposed at the base portion 142a and biased or urged toward the fixed pads 142b and toward the mirror head bracket via one or more biasing elements or springs 142e. Thus, the movable pad 142c and the fixed pads 142b cooperate to form a V-shaped lower channel that slidably receives the V-shaped lower rail 138 therein. Although shown and described as having a spring-tensioned element at the lower slider portion, the mirror assembly may also or otherwise have a spring-tensioned element at the upper slider portion.

The upper rail and/or upper slider portion provide low-friction surfaces, such that contact between the mirror head bracket and the upper rail is made with a low-friction slider. The upper rail 138 is slidably received in the V-shaped channel 140*a* of the upper slider portion 140, while the lower rail 140 is slidably received in the V-shaped channel formed by the fixed pads 142*b* and the spring-tensioned pad 142*c* of the lower slider portion 142. The contact between the mirror head bracket and the lower rail is thus made in part based on a spring loaded tensioner.

In the illustrated embodiment, the adjustment mechanism 120 includes a clutch drive 130 that functions to allow for slippage to allow for manual movement (extension or retraction) of the mirror head along the rails 138, 140 of the support arm 118. The clutch drive 130 may be generally similar to the clutch drive 30, discussed above, such that a detailed discussion of the clutch drives need not be repeated herein. As shown in FIGS. 24 and 25, the clutch drive 130 comprises a spring 130*a* that urges clutch plates 130*b*, 130*c* into engagement with and against the opposite sides of the gear 124 such that rotational driving of the clutch plate rotationally drives the gear. The clutch assembly 130 includes the spring 130*a*, the first clutch disk or plate 130*b*, the drive gear 124, the second clutch disk or plate 130*c*, a slip washer 130*d*, and a clutch cover plate 130*e*, with the components held together by a rivet tube 130*f*. The first clutch plate 130*b* and the second clutch plate 130*c* are rotationally interlinked, such that they rotate together and frictionally engage opposite sides of the pinion or drive gear 124, such that the drive gear 124 is encased on either side by the first and second clutch plates.

The clutch plate is connected to the output gear of the motor of the actuator, such as by interlocking lugs. The clutch plate transfers torque (and rotational motion) to the pinion or gear from the actuator via friction between the pinion and clutch plate surfaces (provided by the force from the spring). The clutch allows for slippage between the pinion and the clutch plates when the force being exerted on the pinion 214 by the rack 140*b* of the upper slider portion 140 is greater than the torque between the pinion and clutch plates. This causes the pinion to rotate relative to the clutch plate, such that the mirror can be extended/retracted manually.

The actuator includes a housing that receives or contains the motor and clutch drive mechanism, with the housing fixedly disposed at or attached to the outboard end of the support structure. Optionally, part of the housing may be integrally formed with the support structure, and the clutch cover plate may attach to the support structure or housing to contain or house the components within the housing structure. Thus, the actuator is a self-contained module or unit that is fixedly or non-movably disposed at the outboard end region (near the outboard end) of the support structure, whereby actuation of the motor rotates the drive gear or pinion to move the mirror head bracket and mirror head along the support structure between the retracted position and the extended position.

Therefore, the present invention provides an extension/retraction mechanism or device that is operable to extend or retract or move the mirror head between its retracted and extended positions or states. The mechanism of the present invention also provides a relatively simple device, which uses a single motor and rack and pinion arrangement to move the mirror head between the extended position and the retracted position.

The mirror assembly may comprise any suitable mirror assembly or structure or housing. Optionally, the mirror assembly may utilize aspects of the mirror assemblies described in U.S. Pat. Nos. 9,796,334; 7,267,449; 6,394,616 and/or 6,213,609, and/or U.S. Publication No. US-2015-0224930, which are hereby incorporated herein by reference in their entireties. Optionally, an exterior rearview mirror assembly of the present invention may include a spotter mirror element to provide a wide angle rearward field of view to the driver of the vehicle equipped with the mirror assembly. The spotter mirror element may utilize aspects of the mirrors described in U.S. Pat. Nos. 8,917,437; 7,255,451; 7,195,381; 6,717,712; 7,126,456; 6,315,419; 7,097,312; 6,522,451; 6,315,419; 5,080,492; 5,050,977; 5,033,835; 8,736,940; 8,021,005; 7,934,844; 7,887,204; 7,824,045 and/or 7,748,856, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. An exterior rearview mirror assembly, for a vehicle, the exterior rearview mirror assembly comprising:
    a mirror head having a mirror casing and a mirror reflective element;
    a support structure configured for attachment at a side of a vehicle, wherein the support structure, with an inboard end of the support structure attached at the side of the vehicle, extends laterally from the side of the vehicle;
    an adjustment mechanism disposed at an outboard end of the support structure that is distal from the inboard end;
    wherein the mirror head comprises a mirror head bracket that is movably mounted at the support structure;
    wherein the adjustment mechanism comprises a rotatably driven gear that engages a toothed track of the mirror head bracket, and wherein rotation of the gear causes translational movement of the toothed track and the mirror head bracket and the mirror head relative to the adjustment mechanism and the support structure to adjust the mirror head position relative to the support structure between a retracted position and an extended position, and wherein, with the inboard end of the support structure attached at the side of the vehicle, the mirror head is closer to the side of the vehicle at which the support structure is attached when in the retracted position as compared to when in the extended position;
    wherein the support structure comprises a pair of support arms that are parallel to one another and that, with the inboard end of the support structure attached at the side of the vehicle, extend laterally from the side of the vehicle;
    wherein the adjustment mechanism is disposed at a bracket that spans between and joins at outboard ends of the support arms; and
    wherein, when the mirror head is moved relative to the support structure, the bracket moves along a passageway in the mirror head.

2. The exterior rearview mirror assembly of claim 1, wherein the adjustment mechanism comprises a motor that, with the inboard end of the support structure attached at the side of the vehicle, operates to rotate the gear in response to a user input disposed in the vehicle, and wherein the user input is actuatable by a driver of the vehicle at which the exterior rearview mirror assembly is attached.

3. The exterior rearview mirror assembly of claim 2, wherein the adjustment mechanism comprises a clutch drive that functions to rotate the gear when the motor is operated and to allow for manual movement of the mirror head relative to the support structure.

4. The exterior rearview mirror assembly of claim 1, wherein the support arms slidably engage the mirror head bracket of the mirror head.

5. An exterior rearview mirror assembly for a vehicle, the exterior rearview mirror assembly comprising:
 a mirror head having a mirror casing and a mirror reflective element;
 a support structure configured for attachment at a side of a vehicle, wherein the support structure, with an inboard end of the support structure attached at the side of the vehicle, extends laterally from the side of the vehicle;
 an adjustment mechanism disposed at an outboard end of the support structure that is distal from the inboard end;
 wherein the mirror head comprises a mirror head bracket that is movably mounted at the support structure;
 wherein the adjustment mechanism comprises a rotatably driven gear that engages a toothed track of the mirror head bracket, and wherein rotation of the gear causes translational movement of the toothed track and the mirror head bracket and the mirror head relative to the adjustment mechanism and the support structure to adjust the mirror head position relative to the support structure between a retracted position and an extended position, and wherein, with the inboard end of the support structure attached at the side of the vehicle, the mirror head is closer to the side of the vehicle at which the support structure is attached when in the retracted position as compared to when in the extended position;
 wherein the support structure comprises a pair of support arms that are parallel to one another and that, with the inboard end of the support structure attached at the side of the vehicle, extend laterally from the side of the vehicle;
 wherein the support arms slidably engage the mirror head bracket of the mirror head; and
 wherein the support arms slidably engage a flat spring of the mirror head bracket of the mirror head.

6. The exterior rearview mirror assembly of claim 5, wherein the adjustment mechanism is disposed at a bracket that spans between and joins at outboard ends of the support arms.

7. The exterior rearview mirror assembly of claim 5, wherein the mirror head bracket moves along the support structure when the rotatably driven gear is rotated.

8. An exterior rearview mirror assembly for a vehicle, the exterior rearview mirror assembly comprising:
 a mirror head having a mirror casing and a mirror reflective element;
 a support structure configured for attachment at a side of a vehicle, wherein the support structure, with an inboard end of the support structure attached at the side of the vehicle, extends laterally from the side of the vehicle;
 an adjustment mechanism disposed at an outboard end of the support structure that is distal from the inboard end;
 wherein the mirror head comprises a mirror head bracket that is movably mounted at the support structure;
 wherein the adjustment mechanism comprises a rotatably driven gear that engages a toothed track of the mirror head bracket, and wherein rotation of the gear causes translational movement of the toothed track and the mirror head bracket and the mirror head relative to the adjustment mechanism and the support structure to adjust the mirror head position relative to the support structure between a retracted position and an extended position, and wherein, with the inboard end of the support structure attached at the side of the vehicle, the mirror head is closer to the side of the vehicle at which the support structure is attached when in the retracted position as compared to when in the extended position;
 wherein the mirror head bracket moves along the support structure when the rotatably driven gear is rotated;
 wherein the support structure comprises an upper rail and a lower rail, and wherein the upper rail movably engages an upper rail portion of the mirror head bracket, and wherein the lower rail movably engages a lower rail portion of the mirror head bracket; and
 wherein the upper rail and the lower rail each comprise a V-shaped rail, and wherein the upper rail portion and the lower rail portion of the mirror head bracket each comprise a V-shaped channel that receives the respective V-shaped rail therein.

9. The exterior rearview mirror assembly of claim 8, wherein the lower rail portion of the mirror head bracket comprises a spring-tensioned element that is biased toward and into engagement with the lower rail.

10. The exterior rearview mirror assembly of claim 8, wherein the inboard end of the support structure is configured to pivotally attach at the side of the vehicle and, with the support structure pivotally attached at the side of the vehicle at which the exterior rearview mirror assembly is attached, the support structure is pivotable via a powerfold actuator that electrically operates to pivot the support structure relative to the side of the vehicle at which the exterior rearview mirror assembly is attached.

11. An The exterior rearview mirror assembly for a vehicle, the exterior rearview mirror assembly comprising:
 a mirror head having a mirror casing and a mirror reflective element;
 a support structure configured for attachment at a side of a vehicle, wherein the support structure, with an inboard end of the support structure attached at the side of the vehicle, extends laterally from the side of the vehicle;
 wherein the support structure comprises a pair of support arms that are parallel to one another and that, with the inboard end of the support structure attached at the side of the vehicle, extend laterally from the side of the vehicle;
 an adjustment mechanism disposed at an outboard end of the support structure that is distal from the inboard end;
 wherein the adjustment mechanism is disposed at a bracket that spans between and joins at outboard ends of the support arms;
 wherein the mirror head comprises a mirror head bracket that is movably mounted at the support structure;
 wherein the adjustment mechanism comprises a rotatably driven gear that engages a toothed track of the mirror head bracket;
 wherein the adjustment mechanism comprises a motor that, with the inboard end of the support structure attached at the side of the vehicle, operates to rotate the gear in response to a user input disposed in the vehicle, and wherein the user input is actuatable by a driver of the vehicle at which the exterior rearview mirror assembly is attached;

wherein rotation of the gear causes translational movement of the toothed track and the mirror head bracket and the mirror head relative to the adjustment mechanism and the support structure to adjust the mirror head position relative to the support structure between a retracted position and an extended position, and wherein, with the inboard end of the support structure attached at the side of the vehicle, the mirror head is closer to the side of the vehicle at which the support structure is attached when in the retracted position as compared to when in the extended position; and wherein, when the mirror head is moved relative to the support structure, the bracket moves along a passageway in the mirror head.

12. The exterior rearview mirror assembly of claim 11, wherein the adjustment mechanism comprises a clutch drive that functions to rotate the gear when the motor is operated and to allow for manual movement of the mirror head relative to the support structure.

13. The exterior rearview mirror assembly of claim 11, wherein the support arms slidably engage the mirror head bracket of the mirror head.

14. An exterior rearview mirror assembly for a vehicle, the exterior rearview mirror assembly comprising:

a mirror head having a mirror casing and a mirror reflective element;

a support structure configured for attachment at a side of a vehicle, wherein the support structure, with an inboard end of the support structure attached at the side of the vehicle, extends laterally from the side of the vehicle;

wherein the support structure comprises a pair of support arms that are parallel to one another and that, with the inboard end of the support structure attached at the side of the vehicle, extend laterally from the side of the vehicle;

an adjustment mechanism disposed at an outboard end of the support structure that is distal from the inboard end;

wherein the adjustment mechanism is disposed at a bracket that spans between and joins at outboard ends of the support arms;

wherein the mirror head comprises a mirror head bracket that is movably mounted at the support structure;

wherein the adjustment mechanism comprises a rotatably driven gear that engages a toothed track of the mirror head bracket;

wherein the adjustment mechanism comprises a motor that, with the inboard end of the support structure attached at the side of the vehicle, operates to rotate the gear in response to a user input disposed in the vehicle, and wherein the user input is actuatable by a driver of the vehicle at which the exterior rearview mirror assembly is attached;

wherein rotation of the gear causes translational movement of the toothed track and the mirror head bracket and the mirror head relative to the adjustment mechanism and the support structure to adjust the mirror head position relative to the support structure between a retracted position and an extended position, and wherein, with the inboard end of the support structure attached at the side of the vehicle, the mirror head is closer to the side of the vehicle at which the support structure is attached when in the retracted position as compared to when in the extended position;

wherein the support arms slidably engage the mirror head bracket of the mirror head; and wherein the support arms slidably engage a flat spring of the mirror head bracket of the mirror head.

15. An exterior rearview mirror assembly for a vehicle, the exterior rearview mirror assembly comprising:

a mirror head having a mirror casing and a mirror reflective element;

a support structure configured for attachment at a side of a vehicle, wherein the support structure, with an inboard end of the support structure attached at the side of the vehicle, extends laterally from the side of the vehicle;

an adjustment mechanism disposed at an outboard end of the support structure that is distal from the inboard end;

wherein the mirror head comprises a mirror head bracket that is movably mounted at the support structure;

wherein the adjustment mechanism comprises a rotatably driven gear that engages a toothed track of the mirror head bracket;

wherein the adjustment mechanism comprises a motor that, with the inboard end of the support structure attached at the side of the vehicle, operates to rotate the gear in response to a user input disposed in the vehicle, and wherein the user input is actuatable by a driver of the vehicle at which the exterior rearview mirror assembly is attached;

wherein the support structure comprises an upper rail and a lower rail, and wherein the upper rail movably engages an upper rail portion of the mirror head bracket, and wherein the lower rail movably engages a lower rail portion of the mirror head bracket;

wherein the upper rail and the lower rail each comprise a V-shaped rail, and wherein the upper rail portion and the lower rail portion of the mirror head bracket each comprise a V-shaped channel that receives the respective V-shaped rail therein; and wherein rotation of the gear causes translational movement of the toothed track and the mirror head bracket and the mirror head relative to the adjustment mechanism and the support structure to adjust the mirror head position relative to the support structure between a retracted position and an extended position, and wherein, with the inboard end of the support structure attached at the side of the vehicle, the mirror head is closer to the side of the vehicle at which the support structure is attached when in the retracted position as compared to when in the extended position.

16. The exterior rearview mirror assembly of claim 15, wherein the adjustment mechanism comprises a clutch drive that functions to rotate the gear when the motor is operated and to allow for manual movement of the mirror head relative to the support structure.

17. The exterior rearview mirror assembly of claim 15, wherein the support structure slidably engages the mirror head bracket of the mirror head.

18. The exterior rearview mirror assembly of claim 15, wherein the lower rail portion of the mirror head bracket comprises a spring-tensioned element that is biased toward and into engagement with the lower rail.

* * * * *

UNITED STATES PATENT AND TRADEMARK OFFICE
CERTIFICATE OF CORRECTION

PATENT NO. : 11,383,645 B2  
APPLICATION NO. : 15/929612  
DATED : July 12, 2022  
INVENTOR(S) : Matthew V. Steffes Page 1 of 1

It is certified that error appears in the above-identified patent and that said Letters Patent is hereby corrected as shown below:

In the Claims

<u>Column 10</u>
Line 40, Claim 11, "An The exterior" should be --An exterior--

Signed and Sealed this  
Thirtieth Day of August, 2022

Katherine Kelly Vidal  
*Director of the United States Patent and Trademark Office*